(12) United States Patent
Walecki

(10) Patent No.: US 11,226,190 B2
(45) Date of Patent: Jan. 18, 2022

(54) MEASUREMENT OF THICKNESS AND TOPOGRAPHY OF A SLAB OF MATERIALS

(71) Applicant: Wojciech Jan Walecki, Sunrise, FL (US)

(72) Inventor: Wojciech Jan Walecki, Sunrise, FL (US)

(73) Assignee: OPTOPROFILER LLC, Sunrise, FL (US)

( * ) Notice: Subject to any disclaimer, the term of this patent is extended or adjusted under 35 U.S.C. 154(b) by 38 days.

(21) Appl. No.: 16/842,743

(22) Filed: Apr. 7, 2020

(65) Prior Publication Data

US 2021/0310795 A1    Oct. 7, 2021

(51) Int. Cl.
*G01B 9/02*    (2006.01)
*G01B 11/06*    (2006.01)

(52) U.S. Cl.
CPC .......... *G01B 11/06* (2013.01); *G01B 9/02091* (2013.01)

(58) Field of Classification Search
CPC  G01B 11/06; G01B 11/0675; G01B 9/02091; G01B 9/0209; G01B 9/02008; G01B 9/02011; G01B 9/02021; G01B 9/02028; G01B 9/02044; G01B 9/02063; G01B 9/02067; G01B 9/02068
See application file for complete search history.

(56) References Cited

U.S. PATENT DOCUMENTS

| | | | | |
|---|---|---|---|---|
| 7,116,429 | B1 * | 10/2006 | Walecki | G01B 11/0675 356/503 |
| 9,915,564 | B1 * | 3/2018 | Walecki | G01J 3/10 |
| 2008/0018906 | A1 * | 1/2008 | Kurokawa | A61B 5/103 356/479 |
| 2011/0279822 | A1 * | 11/2011 | Kannaka | G01B 11/2441 356/503 |
| 2018/0034233 | A1 * | 2/2018 | Fischer | H01S 3/137 |
| 2018/0202794 | A1 * | 7/2018 | Walecki | G01J 3/26 |
| 2018/0299255 | A1 * | 10/2018 | Walecki | G01B 9/02021 |
| 2019/0094012 | A1 * | 3/2019 | Walecki | G01B 9/02018 |
| 2019/0293407 | A1 * | 9/2019 | Tahara | G02B 27/283 |
| 2020/0011654 | A1 * | 1/2020 | Safrani | G01B 11/2441 |

* cited by examiner

*Primary Examiner* — Tarifur R Chowdhury
*Assistant Examiner* — Jonathon Cook

(57) ABSTRACT

We describe apparatus for measurement of thickness and topography of slabs of materials employing probes with filters using polarization maintaining fibers.

20 Claims, 24 Drawing Sheets

MEASUREMENT OF THICKNESS AND TOPOGRAPHY OF A SLAB OF MATERIALS

CROSS-REFERENCE TO RELATED APPLICATIONS

There are no related applications.

STATEMENT REGARDING FEDERALLY SPONSORED RESEARCH OR DEVELOPMENT

There was no federal sponsorship for this research and development.

THE NAMES OF THE PARTIES TO A JOINT RESEARCH AGREEMENT

There was no joint development agreement.

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE OF THE MATERIAL ON THE COMPACT DISC

There is no appendix. There is no disc.

STATEMENT REGARDING PRIOR DISCLOSURES BY THE INVENTOR OR A JOINT INVENTOR

There was no public prior disclosure of the invention.

BACKGROUND OF THE INVENTION

Our invention is related to the determining the topography and thickness of slabs of materials. More particularly, the present invention in one of its embodiments relates to measuring the thickness of slabs of materials using a spectroscopic system. The invention can be used for measurement of the topography and thickness of semiconductors and other materials ranging from 0.1 micrometer up to 10 cm.

The invention can be used to measure the thickness of slabs of homogenous materials, thickness of layered materials, refractive indices of materials, and the roughness of the interfaces between material layers.

The invention may be used in applications involving back-end processing of semiconductor chips, grinding and polishing of patterned and blanket wafers, and processing of micro-electromechanical-systems, such as but not limited to pressure monitors, micro-mirrors and similar advanced devices and structures.

BRIEF SUMMARY OF THE INVENTION

The invention describes a novel system for the measurement of the thickness and topography of a slab of material where signals are collected and processed using a system filter employing a polarization maintaining optical fiber.

DETAILED DESCRIPTION OF THE INVENTION

Detailed Description of the Drawings

Figure 1:
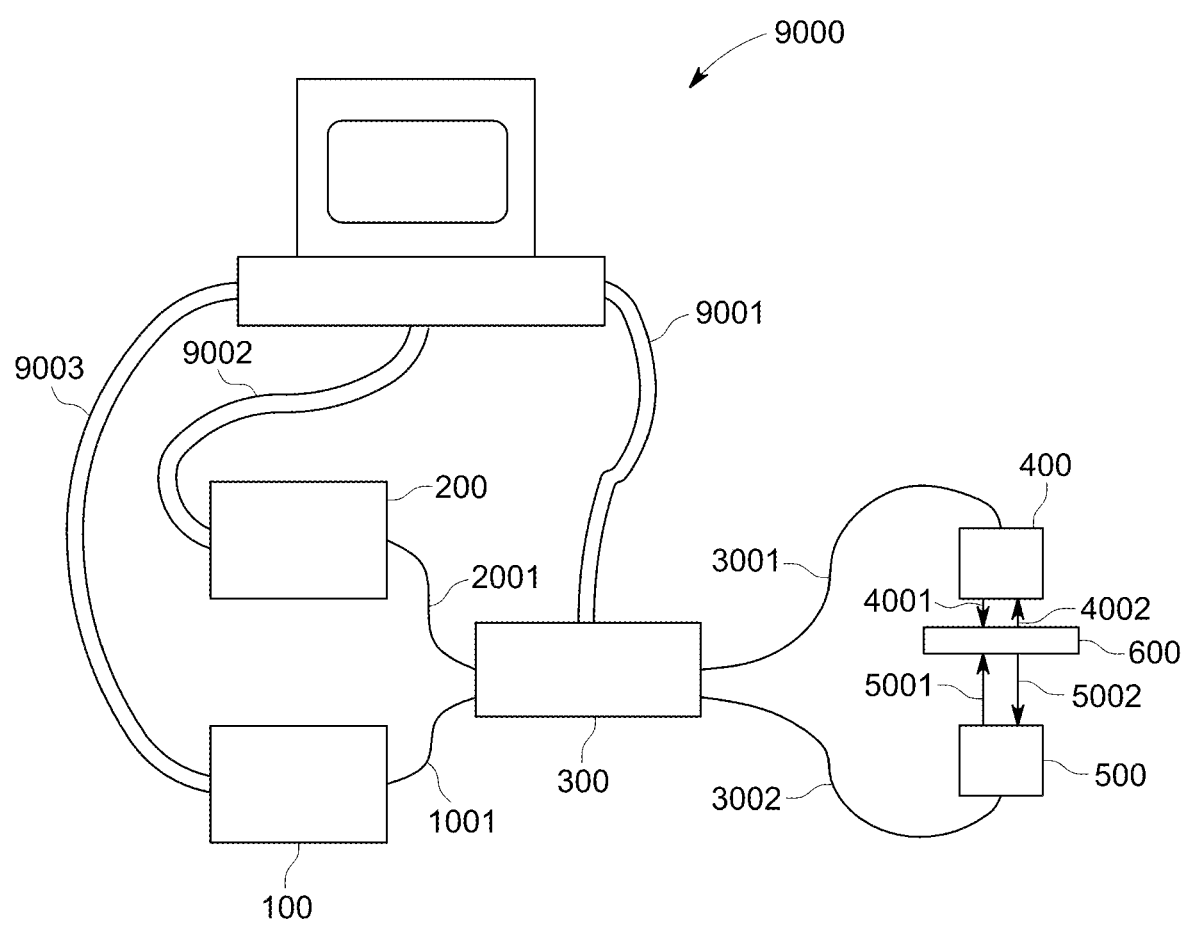
FIG. 1 represents an optical schematic wafer thickness and topography metrology system.

FIG. 1 represents a two-probe system for wafer thickness measurements. The broadband light source 100 emits a light beam which propagates through a single mode fiber 1001 to optical beam controller 300. A portion of the light beam propagates through the single mode fiber 3001 to the upper probe 400. The upper probe 400 emits a beam 4001 impinging the upper surface of the wafer 600. The reflected radiation 4002 is collected by the same upper probe 400. Similarly, the portion of the beam exiting the optical beam controller 300 is propagating through the single mode fiber 3002 to the lower probe 500. The lower probe 500 emits a beam 5001 impinging the lower surface of the wafer 600. The reflected radiation 5002 is collected by the same upper probe 500. The reflected radiation collected by probes 500 and 400 is directed through fibers 3001 and 3002 to optical beam controller 300, and later transmitted through the single mode fiber 2001 towards spectroscopic system 200. A computer system 9000 is connected to the beam controlling module 300, light source 100, and the spectroscopic system 200 by means of cables 9001, 9002, and 9003. Cables 9001, 9002, and 9003 may be implemented as physical electrical cables, fiber optic cables, or wireless connections.

Figure 2:
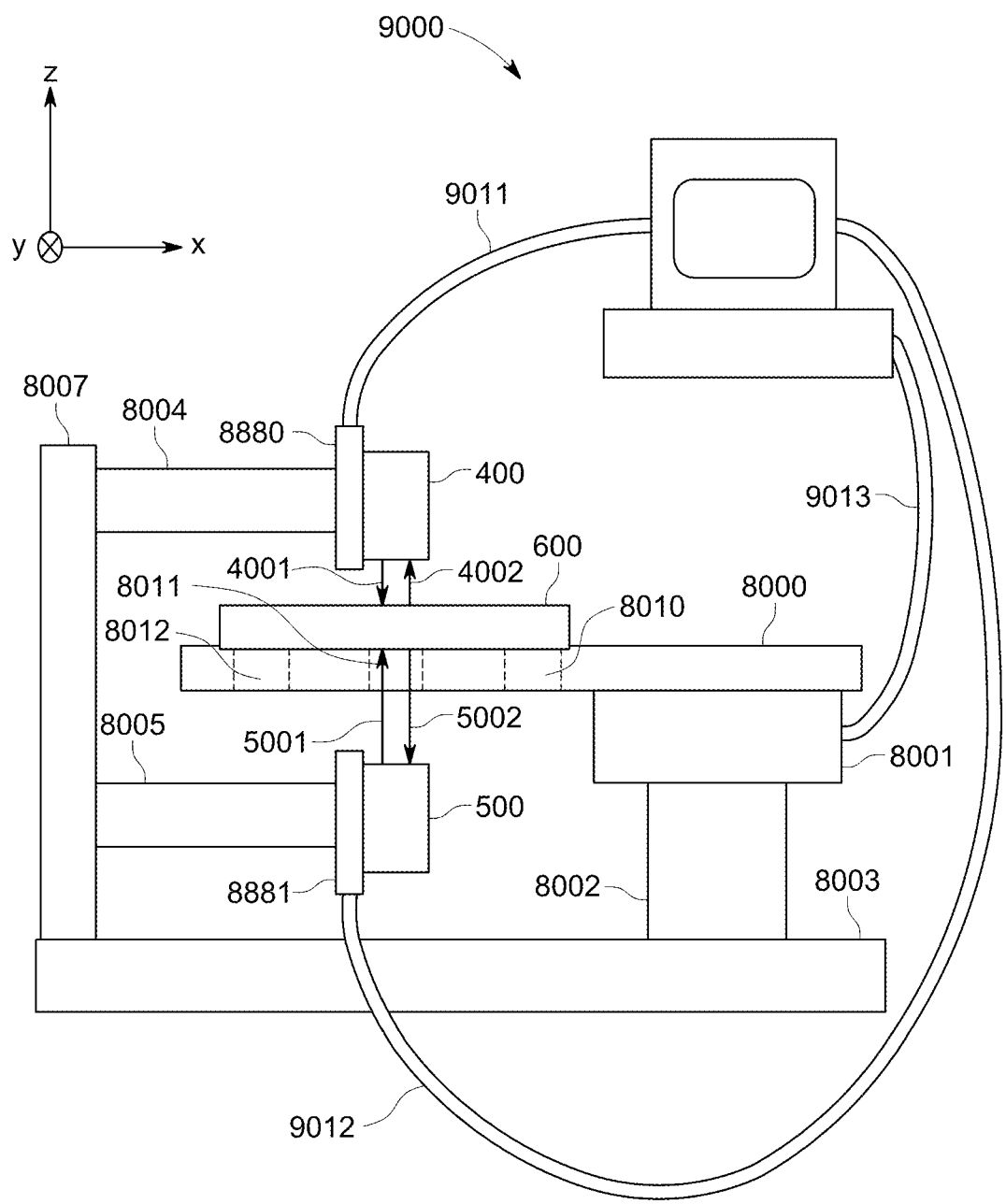
FIG. 2 represents an electromechanical schematic of a system for measurement of the thickness and topography of a slab of material.

FIG. 2 represents the mechanical portion of metrology system with an XY stage. The coordinate system is shown in the upper left corner of the drawing. The measured slab of material 600 resides on wafer chuck 8000. Wafer chuck 8000 is provided with holes 8010, 8011, 8012 allowing optical access to the slab from the lower side of the slab. In this way, radiation emitted from the lower probe can be reflected by the lower side of the wafer. The top probe 400 is mounted on positioning stage 8880 attached to a bar 8004 to stand 8007, while the bottom probe 500 on positioning stage 8881 attached to bar 8005 to stand 8007. The stand 8007 is mounted on tool base 8003. The wafer chuck 8000 is mounted to the table motion XY stage 8001 which is residing on the motion stage base 8002 which is mounted to tool base 8003. Positioning stages 8880 and 8881 can adjust the position of probes 400 and 500 in the z direction. By changing the position of probes 400 and 500 in the z direction, one can change the distance between probes 400 and 500 and sample 600. Both stages 8880 and 8881 have a capability to adjust tilt and pitch angle of each probe with respect to z axis and at least one of stages 8880 and 8881 has ability to adjust position of mounted on it probe in XY direction. Positioning stages allow alignment of the beams 4001 and 5001 in collinear and opposite orientation and to position them in the direction perpendicular to the surface of the sample 600. The motion XY stage 8001, and positioning stages 8880 and 8881 are controlled by the computer system 9000 and are connected to computer system by means of cables 9011, 9012 and 9013. Cables 9011, 9012 and 9013 may be implemented as physical electrical cables, fiber optic cables, or wireless connections.

Figure 3:
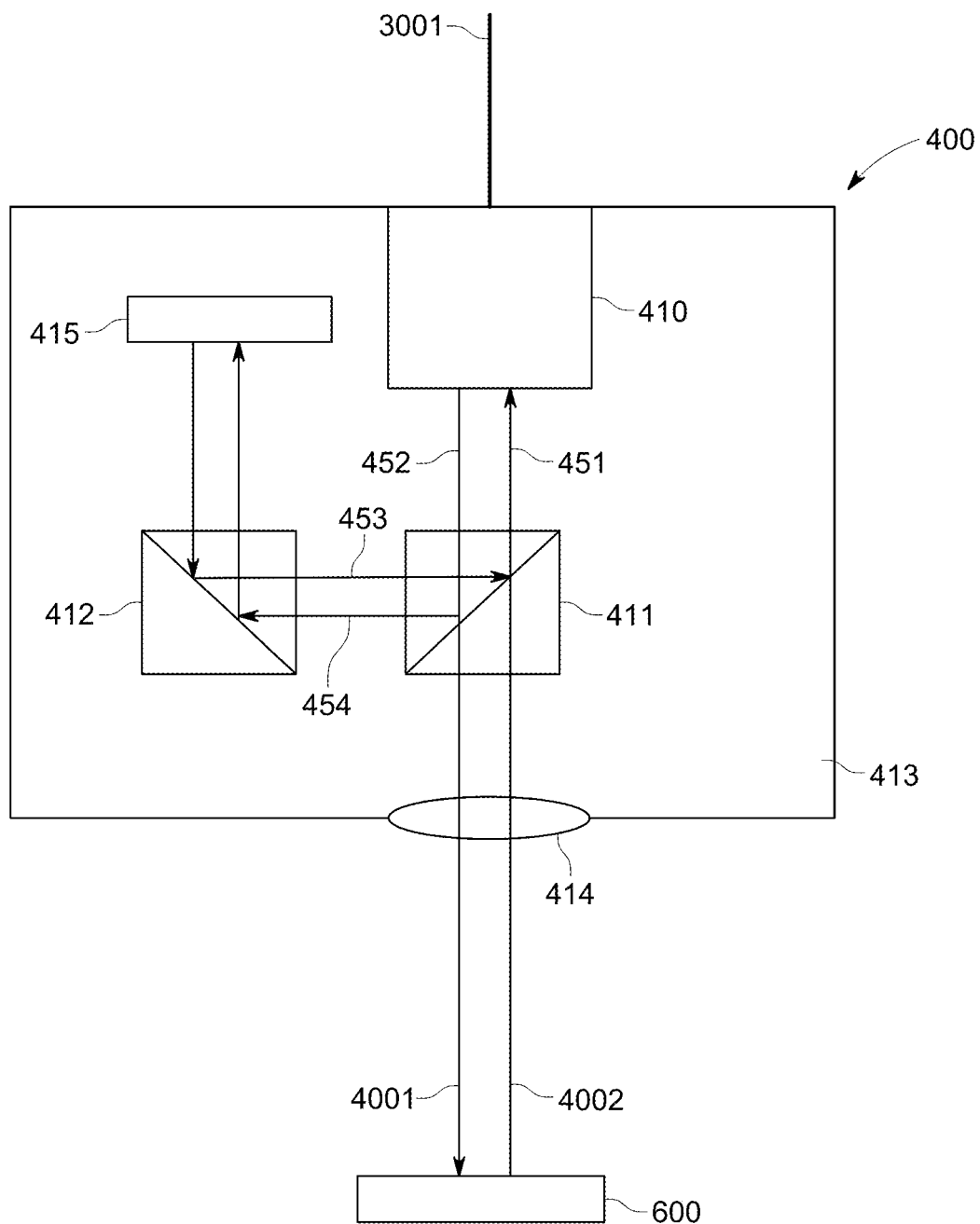
FIG. 3 represents the inner construction of the probe with a folded reference arm according to the first embodiment.

FIG. 3 represents the inner construction of the probe 400 with folded reference arm according to the first embodiment. The single mode fiber 3001 is connected to probe 400 and delivers radiation to collimator module 410. The beam forming module transmits beam 452 through the beam-splitter 411 which splits radiation into two portions: the first portion is directed toward beam forming lens module 414, while the second portion of the radiation 454 is directed towards the reference arm comprising the beam-folding element 412, and reference reflecting element 415. The radiation 454 propagates to beam folding element 412 and the radiation reflected from the beam-folding element 412 is directed towards reflecting element 415, which directs the radiation 453 back the beam folding element 412 towards the beam-splitter 411. The beam forming module 414 is emitting optical radiation 4001 propagating towards the measured sample 600. The reflected from sample 600 beam 4002 propagates through the lens module 414. The module 414 transmits the radiation towards and through the beam-splitter 411, where it is combined with radiation 454, with which it interferes. The resulting combined beam 451 is transmitted towards the collimator module 410 which is coupling it into the single mode fiber 3001. Probe resides inside the enclosure 413 which supports all the elements residing inside the probe. The reflecting reference arm element 415 may be a mirror, a hollow or solid retroreflector, retroreflecting prism, or any reflecting surface.

Figure 4:
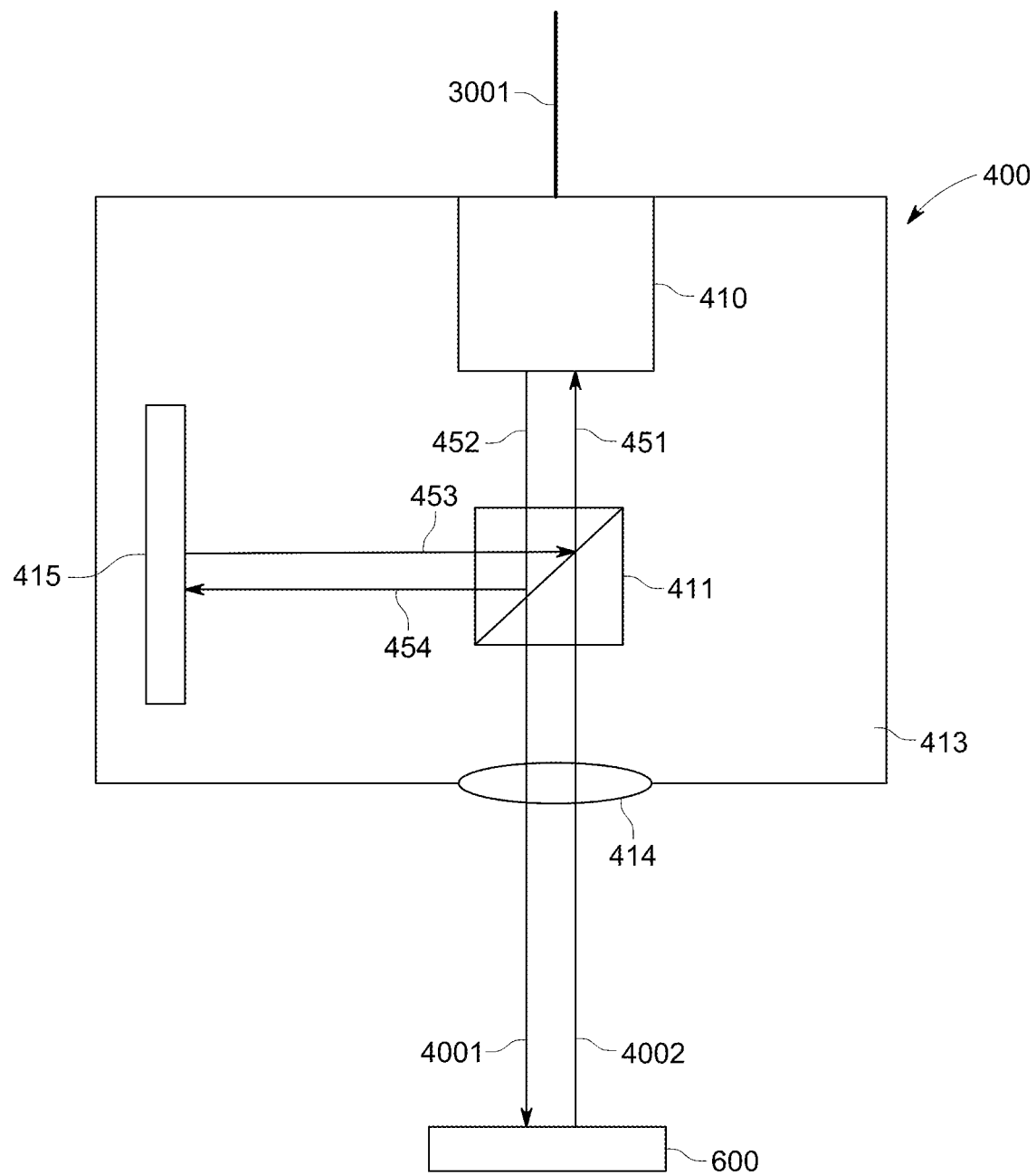
FIG. 4 represents the inner construction of the probe with a straight reference arm according to the first embodiment.

FIG. 4 represents the inner construction of the probe 400 with straight arm reference arm according to the first embodiment. The single mode fiber 3001 is connected to probe 400 and delivers radiation to collimator module 410. The beam forming module transmits beam 452 through the beam-splitter 411 which splits radiation into two portions: the first portion is directed toward beam forming lens module 414, while the second portion of the radiation 454 is directed towards the reference arm comprising reference reflecting element 415. The radiation 454 propagates to reference reflecting element 415 which directs the radiation 453 back to the beam-splitter 411. The beam forming module is emitting optical radiation 4001 propagating towards the measured sample 600. The reflected from sample 600 beam 4002 propagates through the lens module. The module 414 transmits the radiation towards and through the beam-splitter 411, where it is combined with radiation 454, with which it interferes. The resulting combined beam 451 is transmitted towards the collimator module 410 which is coupling it into the single mode fiber 3001. Probe resides inside the enclosure 413 which supports all the elements residing inside the probe. The reflecting reference arm element 415 may be a mirror, a hollow or solid retroreflector, retroreflecting prism, or any reflecting surface.

Figure 5:
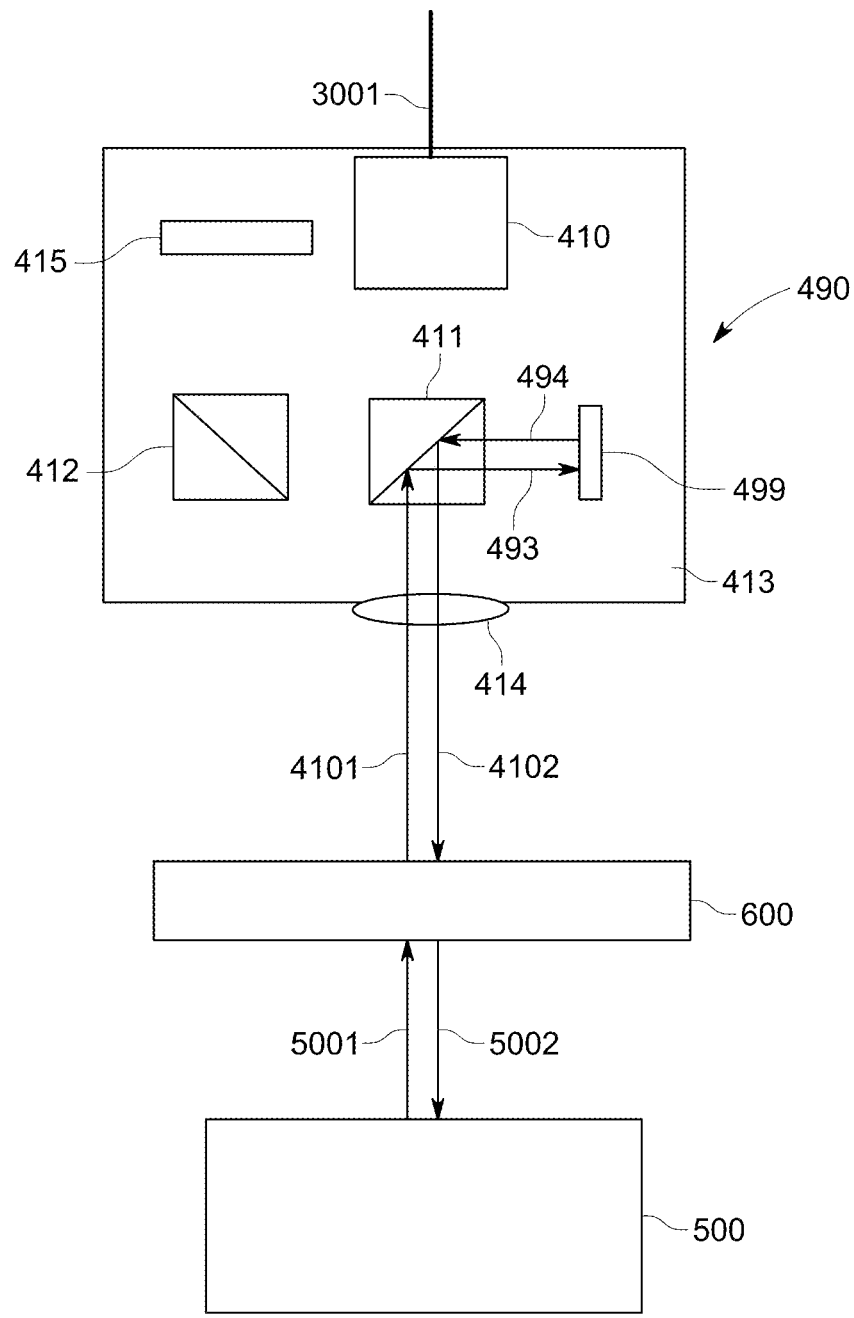
FIG. 5 represents the inner construction of the probe with a reference arm according to the first embodiment, with an additional reflective element for easier alignment of the system of two probes.

FIG. 5 represents the inner construction of the probe 490 with reference arm according to the first embodiment, and reflective element allowing fast alignment of the system of two probes. In addition to elements described in FIG. 3 a reflective element 499 is been added. The probe 490 may be used in place of one or both probes 400 or 500. In this arrangement, radiation 5001 emitted by other probe 500 is transmitted by sample 600 and emerges from sample 600 as radiation 4101. Portion of the beam denoted 4101 is transmitted through lens 414 to beam-splitter 411. Portion of the beam 4101 denoted as 493 is deflected by the beam-splitter 411 towards reflective element 499. The reflected portion of the beam 494 is reflected back towards beam-splitter 411, which deflects portion of it 4102 towards sample 600, and produces transmitted portion of the beam 5002 entering the second probe 500. By changing the position of the probe 490 with respect to the second probe 500 we can optimize (maximize) the amount of radiation 5002 detected by the probe 500, and we can optimize the mutual alignment of probes 490 and 500 by means of positioning stages 8880 and 8881 defined in FIG. 2. The alignment reflecting element 499 may be a mirror, a hollow or solid retroreflector, retroreflecting prism, or any reflecting surface.

Figure 6:
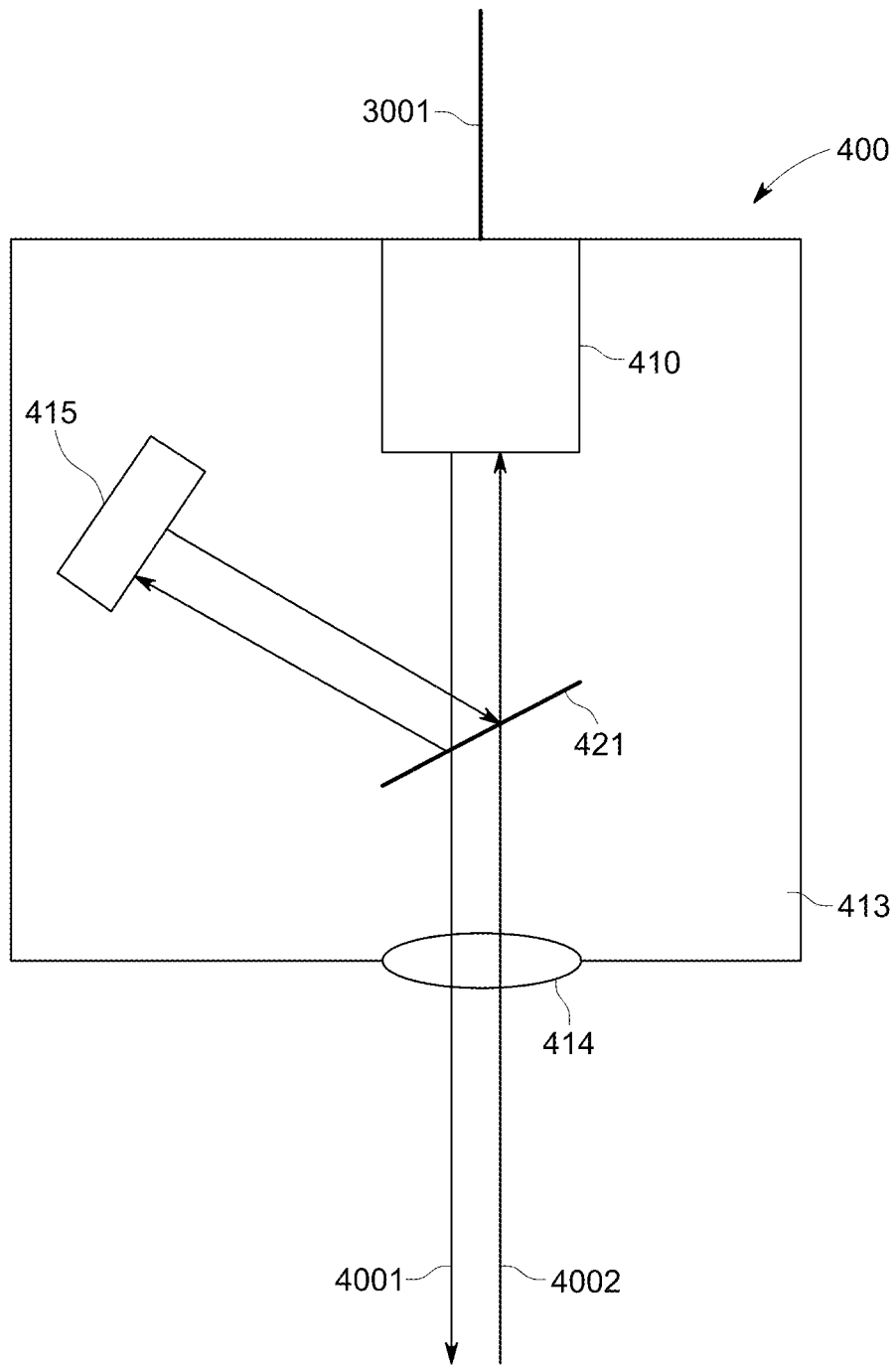
FIG. 6 represents the inner construction of the probe with a reference arm according to the second embodiment.

FIG. 6 represents the probe's inner construction 400 with reference arm according to the second embodiment, where single thin plate beam-splitter 421 is directing light towards the reflecting element 415.

Figure 7:
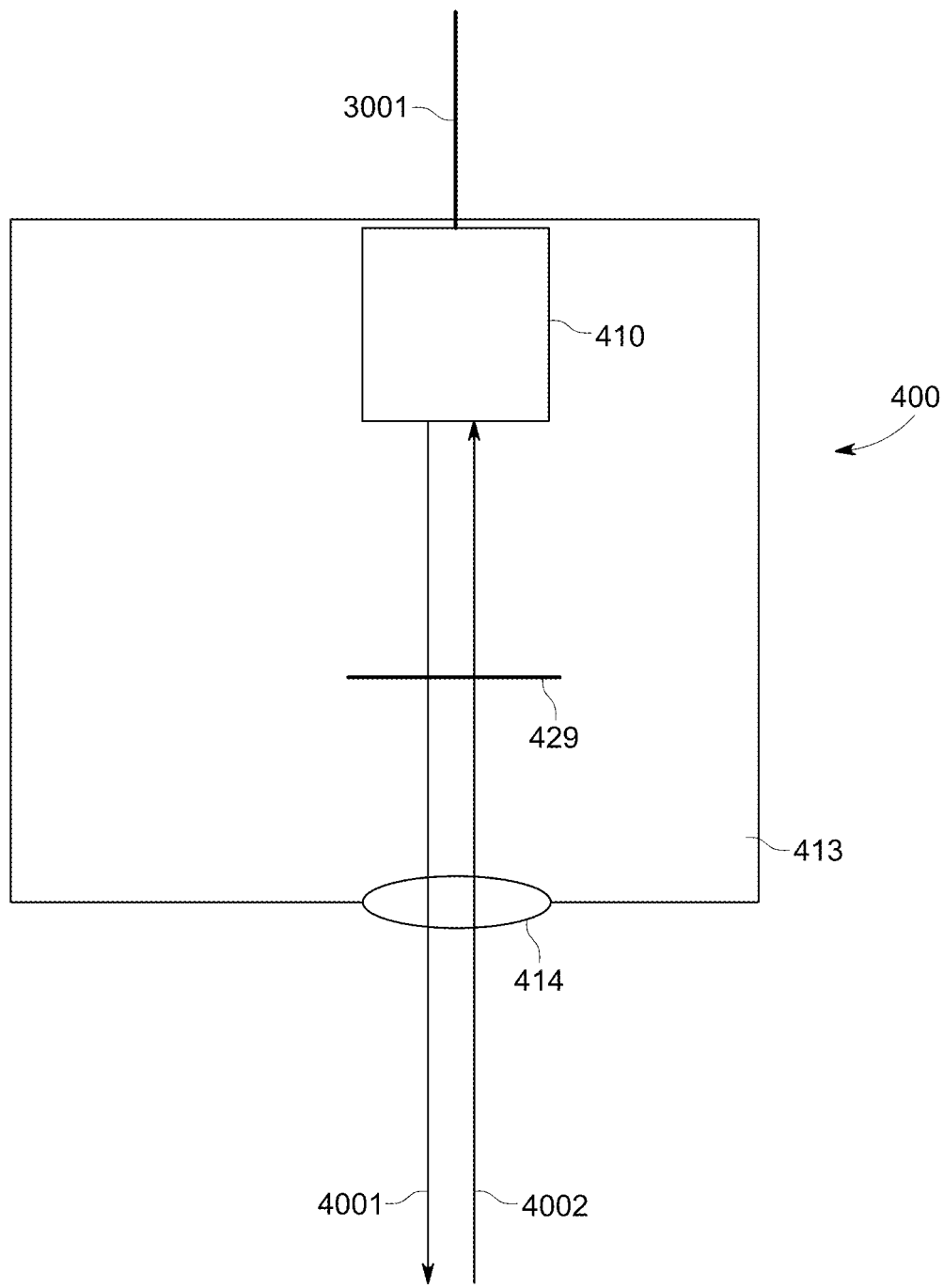
FIG. 7 represents the inner construction of the probe with reference arm according to the third embodiment.

FIG. 7 represents the probe's inner construction 400 with reference arm according to the third embodiment, where the thin reference beam-splitter 429 is placed in direction perpendicular to the propagation of the beam inside the probe and splits portion of the radiation directly back into the collimator 410.

Figure 8:
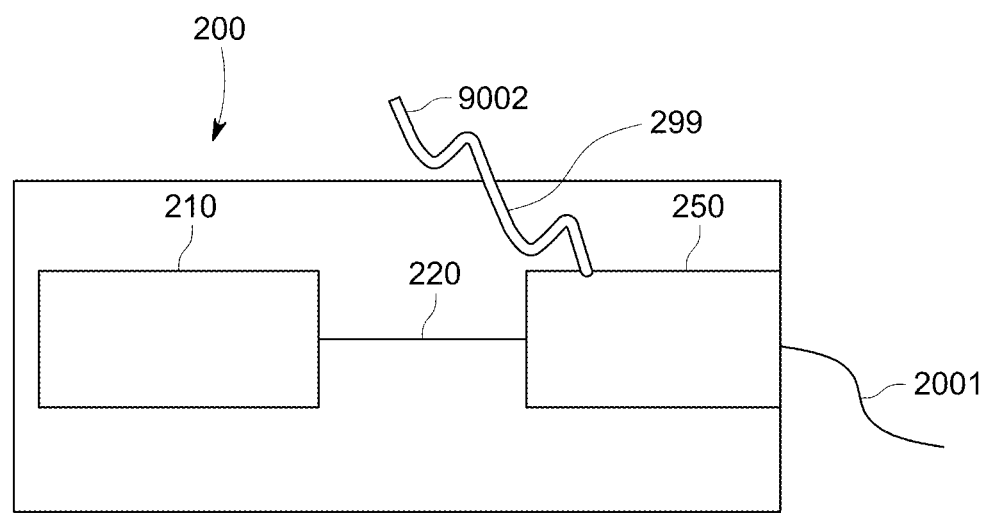
FIG. 8 represents a spectroscopic system with a Polarization Maintaining Fiber Based Spectral filter (PMFBS filter)

FIG. 8 represents a spectroscopic system with a filter which comprises a filter 250 connected through a fiber 220 into spectrometer 210. Filter 250 is connected through electrical connection 299 to cable 9002 shown in FIG. 1. The input radiation is delivered through the single mode fiber 2001 into the filter module.

Figure 9:
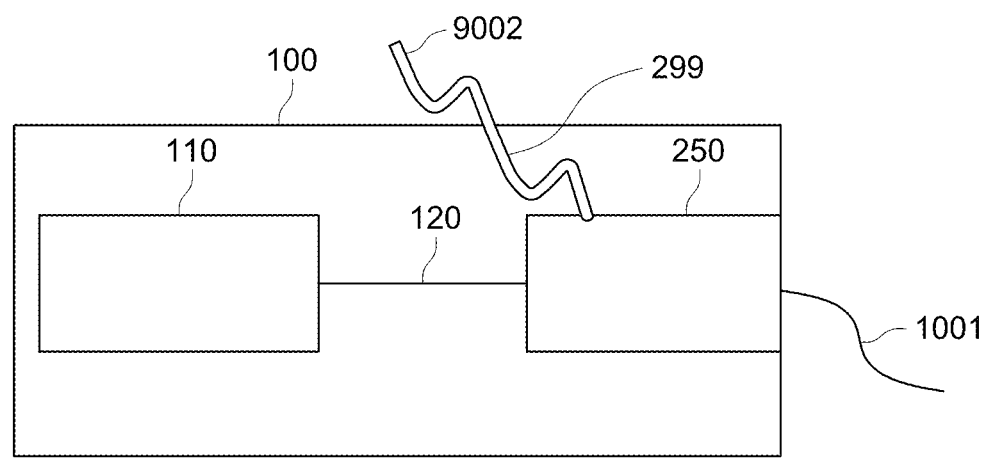
FIG. 9 represents a low coherence light source with Polarization Maintaining Fiber Based Spectral filter (PMFBS filter)

FIG. 9 represents a light source with optional filter which comprises a filter 250 connected through a fiber 120 into spectrometer low coherence light source 110. Filter 250 is connected through electrical connection 299 to cable 9002 shown in FIG. 1. The output radiation is delivered through the single mode fiber 1001. Please note that simple light source is a special case when the filter has constant transmission.

Figure 10:
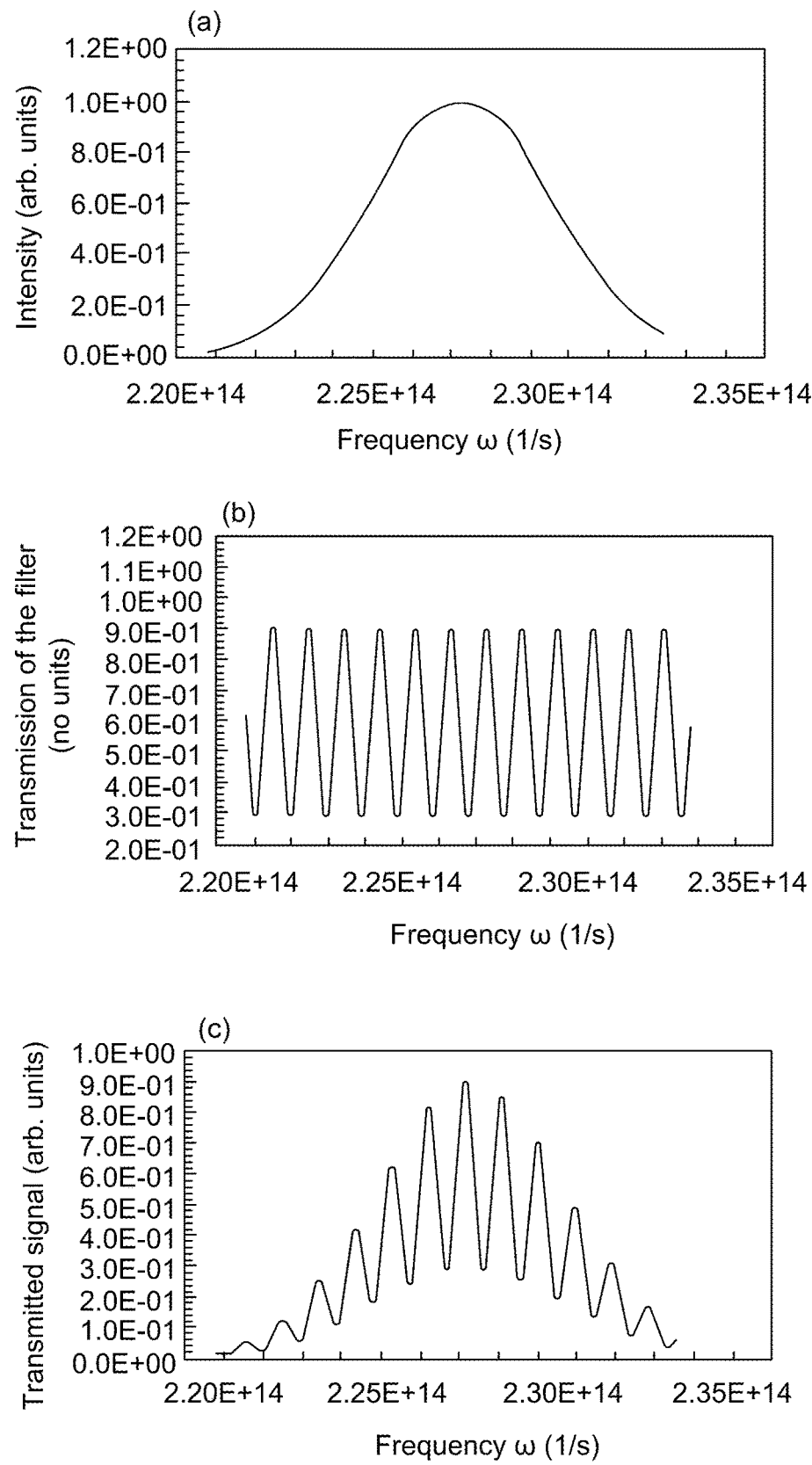
FIG. 10 represents the spectrum of the light source, the reflectance spectrum of the distance probe, and the spectrum of the signal from the distance probe.

FIG. 10 represents spectrum of light source in panel (a), reflectance spectrum of distance probe in panel (b), and spectrum of signal from the distance probe (b). In panel (a), the source spectrum of the light source was assumed to have form of gaussian spectrum in form $$I(\lambda) = I_0 e^{-\left(\frac{\lambda - \lambda_c}{\Delta \lambda}\right)^2}$$

where for the purpose of this example we set $I_0$=1 arb. units, $\lambda_c$=1320 nm, and $\Delta\lambda$=20 nm.

In panel (b) the reflectance spectrum of the distance probe given by Equations (10) and (11) was calculated using following parameters: A=0.6, B=0.3, $\varphi$=0.1, c=3.00·10$^8$ m/s, $L_{reference}$=5.00·10$^{-2}$ m, and $L_{sample}$=5.10·10$^{-2}$ m.

Figure 11:
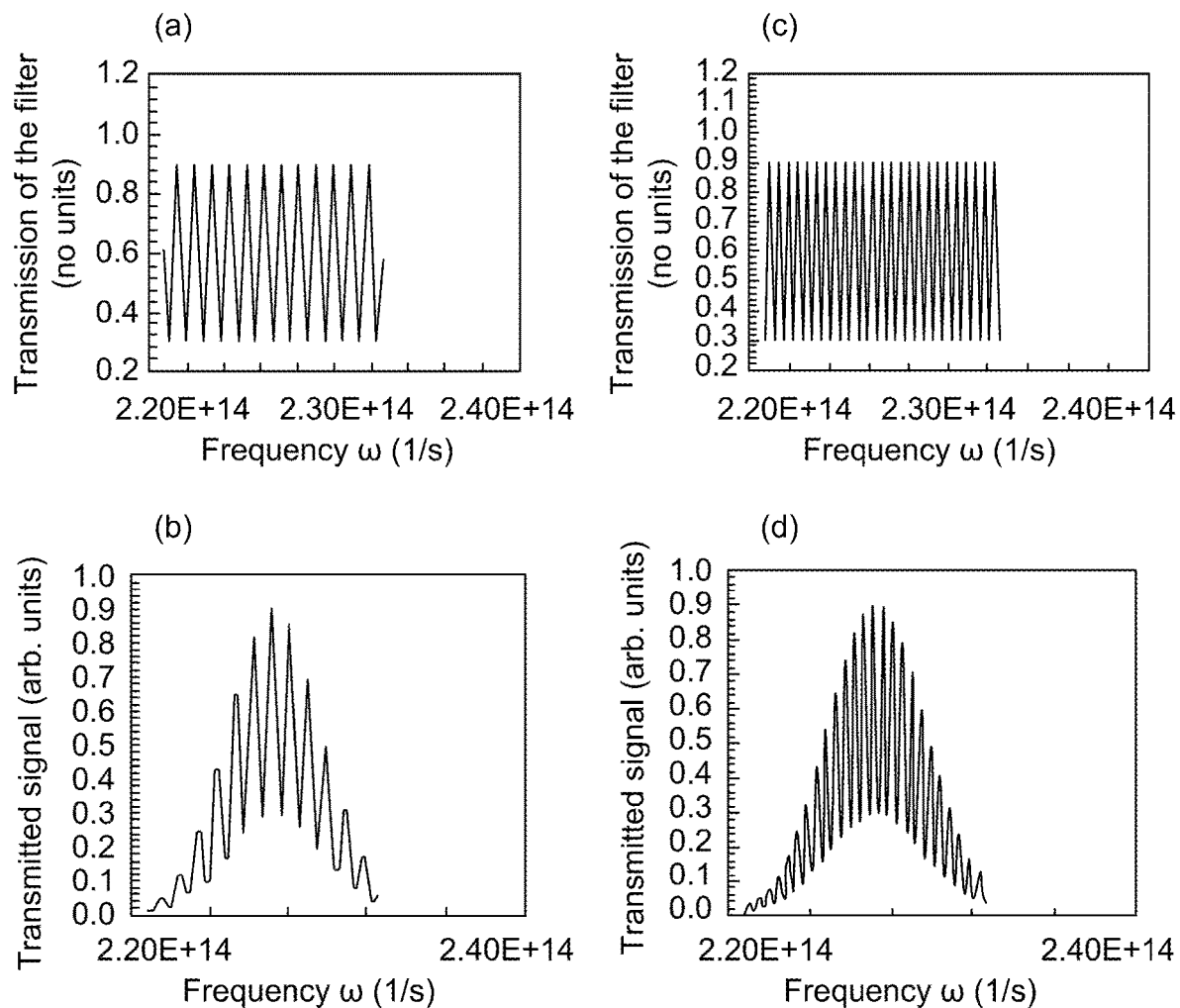
FIG. 11 represents the spectra produced by the distance probe positioned at two different distances from the sample.

FIG. 11 represents the spectra produced by the distance probe positioned at two different distances from the sample. Reflectance spectrum and signal shown in panel (a) and (b) was obtained using the same parameters as reflectance spectrum and signal shown in FIG. 6 new: A=0.6, B=0.3, $\varphi$=0.1, c=3.00·10$^8$ m/s, $L_{reference}$=5.00·10$^{-2}$ m, and $L_{sample}$=5.10·10$^{-2}$ m. Reflectance spectrum and signal shown in panel (c) and (d) where obtained when $L_{sample}$=5.20·10$^{-2}$ m, while all other parameters where kept as in the panels (a) and (b). The magnitude of the difference between sample and reference arm increased from 1 mm in panels (a) and (b) to 2 mm in panels (c) and (d) resulting in decrease of the spacing between fringes by factor of 2.

Figure 12:
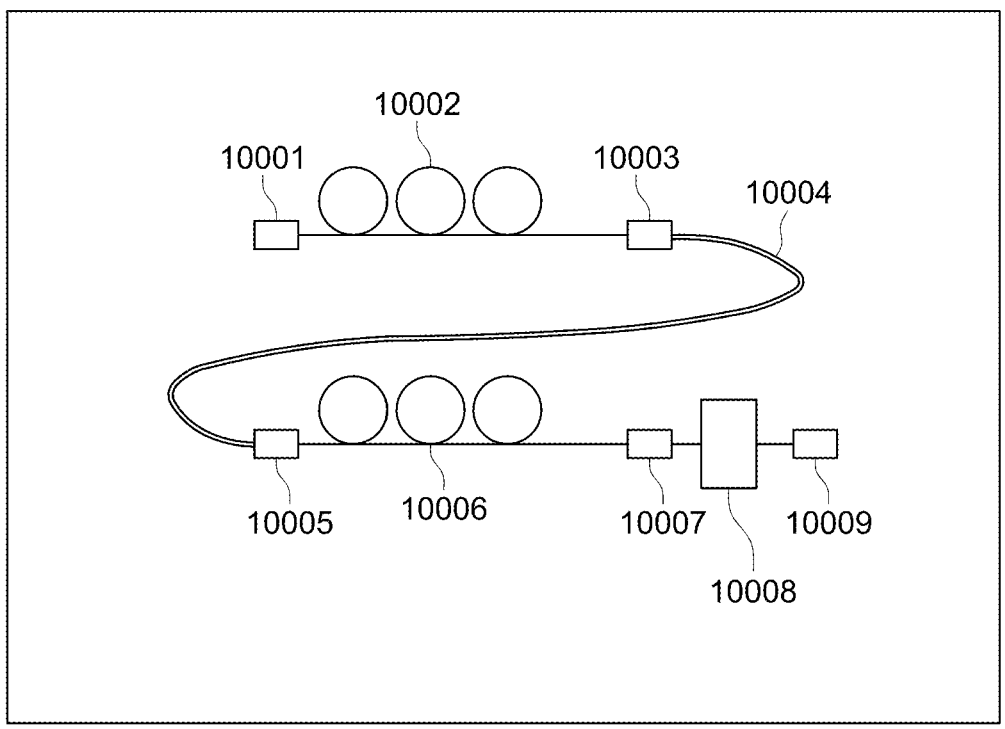
FIG. 12 represents a spectral filter employing a polarization maintaining fiber (PM. We will refer to this filter as the Polarization Maintaining fiber based spectral filter (PMFBS filter).

FIG. 12 represents spectral filter 10000 employing polarization maintaining fiber PMFBS, where 10001 Is first single mode connectors assembly, 10002 is the first polarization controller, 10003 is second single mode connector assembly, 10004 is single mode polarization maintaining fiber, 10005 is the third second single mode fiber connector assembly, 10006 is the second polarization controller, 10007 is the fourth single mode fiber connector assembly, 10008 is a linear polarizer, and 10009 is a fifth single mode fiber connector assembly. Light enters the PMFBS at the connector assembly 10001 with arbitrary state of polarization determined by characteristics of light source and all optical components residing between the light source 110 defined in the FIG. 9 and PMFBS and is transmitted to polarization controller 10002. The polarization controller 10002 modifies state of the polarization of the radiation and transmits it towards connector 10003 so the polarization exiting 10003 and entering polarization maintaining fiber 10004 has electric field oriented at approximately 45 degrees with respect to fast axis of the polarization maintaining fiber 10004. Polarization controller 10006 is acting as half wave plate adjusting orientation of the polarization selected by linear polarizer 10008, in such way that 10006 together with 10008 acts as a linear polarizer oriented at the angle 45 degrees with respect to the fast axis of the polarization maintaining fiber 10004. Light transmitted through the connector 10005 has its polarization adjusted in such way that the light polarized along the slow axis in the polarization controller 10006 exits the linear polarizer 10008 with its intensity attenuated by a factor of % and light polarized along fast axis in polarization controller 10006 exits the linear polarizer 10008 with its intensity attenuated by factor of %. It is possible to replace the polarization controller 10006 by a polarization maintaining fiber, or eliminate it and connect the polarization maintaining fiber to connector assembly 10007 if the connector assembly 10007 is manufactured to assure that the linear polarizer 10008 is oriented at 45 degrees with respect to the fast axis of polarization maintaining fiber.

Figure 13:
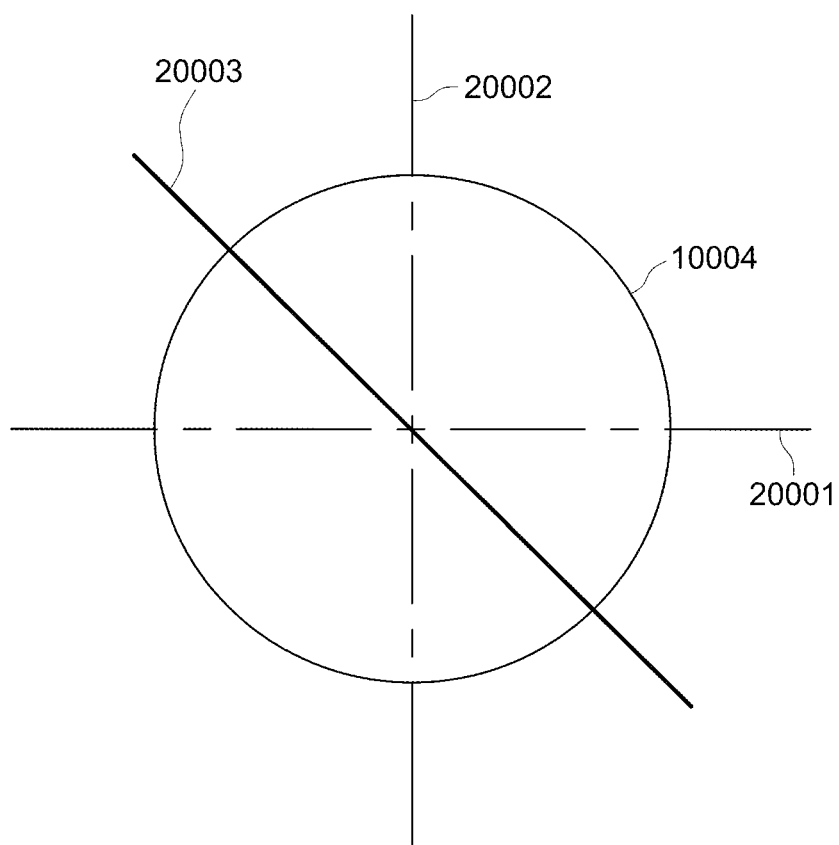
FIG. 13 represents the relative orientations of the fast and slow axis of the polarization maintaining optical fiber and linear polarizer

FIG. 13 represents the relative orientations of the fast and slow axis of the polarization maintaining optical fiber 10004 and linear polarizer 10008. The fast-optical axis is denoted as dashed line 20002, the slow optical axis is denoted as dashed 20001 and axis of linear polarizer is denoted as solid line 20003.

Figure 14:
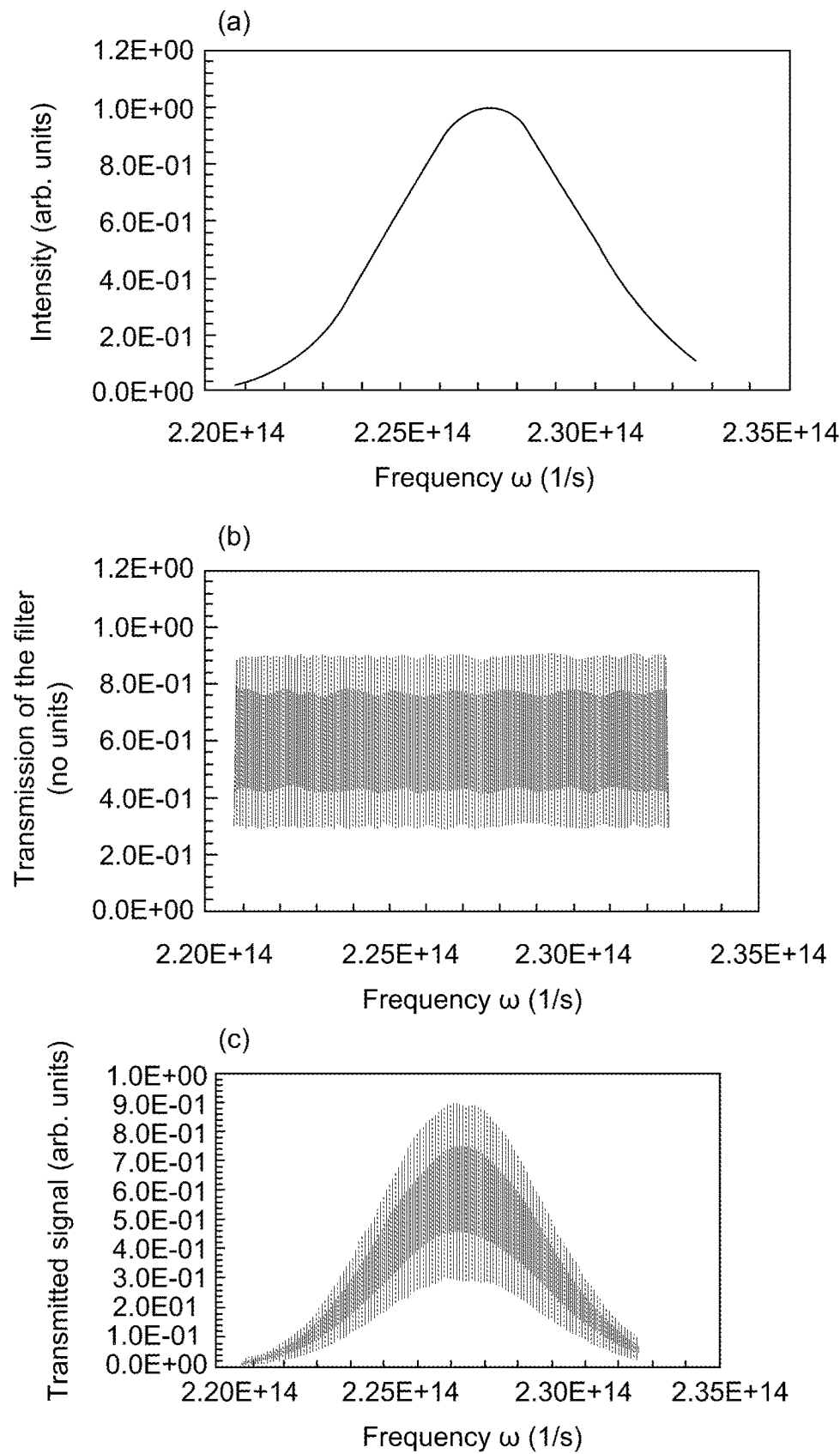
FIG. 14 represents various stages of signal fringe formation and factors contributing to their formation

FIG. 14 represents various stages closely spaced fringes in signal spectrum and factors contributing to their formation, all parameters are the same as in FIG. 10 except for $L_{sample}$=5.60·10$^{-2}$ m which represents the spectrum of light source in panel (a), reflectance spectrum of distance probe in panel (b), and spectrum of signal from the distance probe (c). In panel (a), the source spectrum of the light source was assumed to have form similar to commonly encountered in practice gaussian spectrum in form $$I(\lambda) = I_0 e^{-\left(\frac{\lambda - \lambda_c}{\Delta \lambda}\right)^2}$$

where for the purpose of this example we set $I_0$=1 arb. units, $\lambda_c$=1320 nm, and $\Delta\lambda$=20 nm. In panel (b) the reflectance spectrum of the distance probe given by Equations (10) and (11) was calculated using following parameters: A=0.6, B=0.3, $\varphi$=0.1, c=3.00·10$^8$ m/s, $L_{reference}$=5.00·10$^{-2}$ m, and $L_{sample}$=5.60·10$^{-2}$ m.

Figure 15:
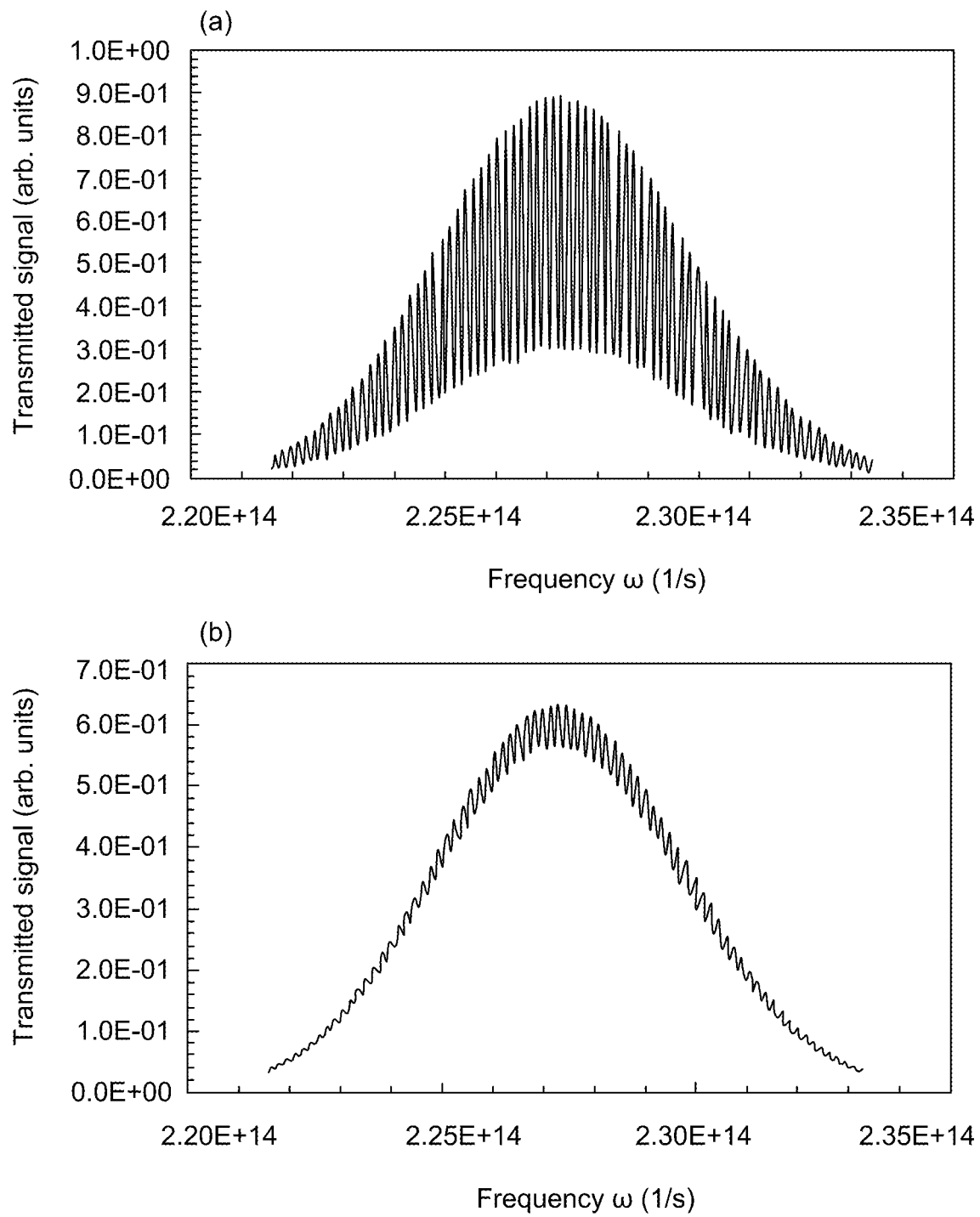
FIG. 15 represents closely spaced fringes as recorded by high and low resolution spectrometers.
Figure 16:
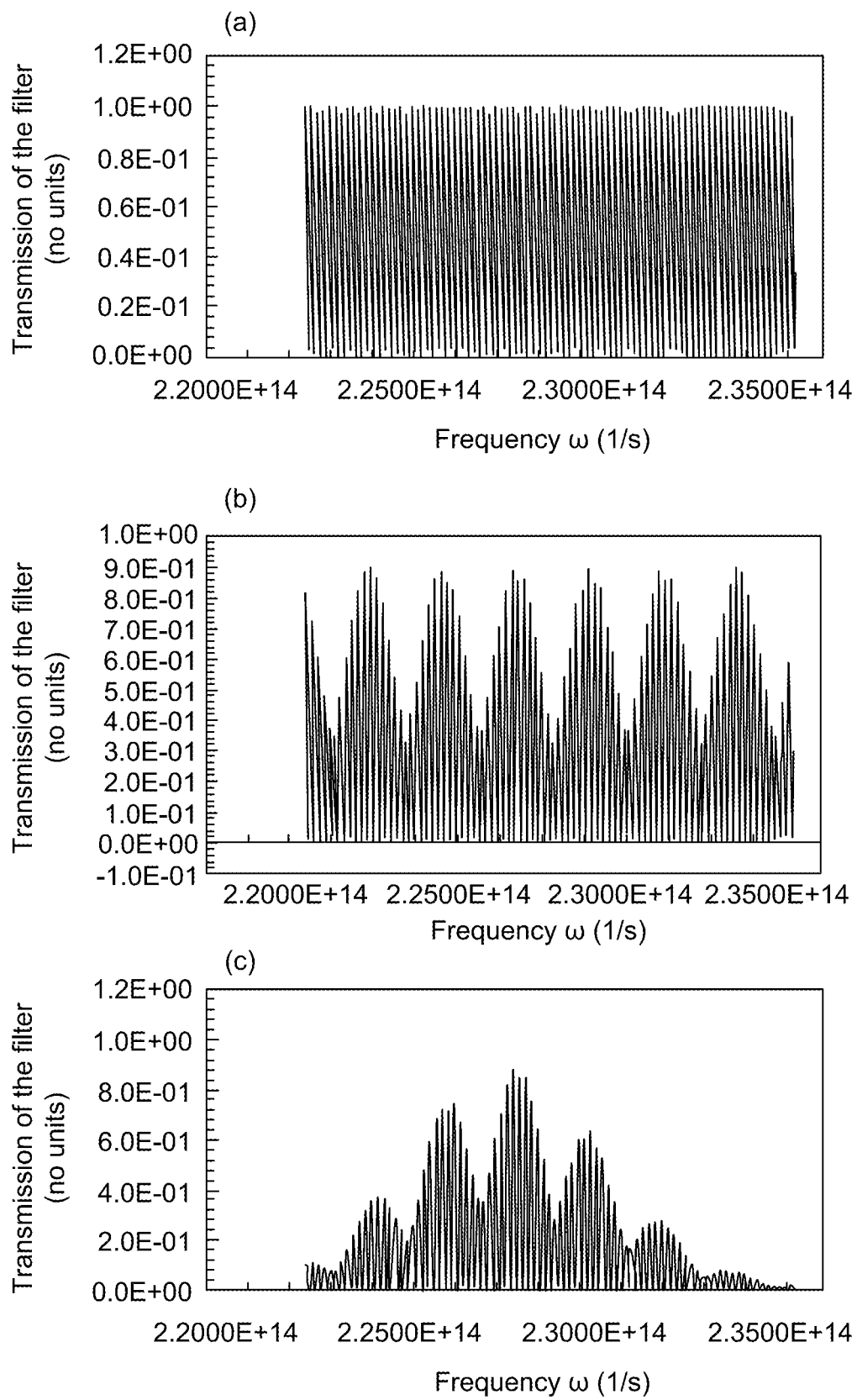
FIG. 16 represents signal exhibiting beat fringes when the distance probe is connected to a PMFBS filter.

FIG. 15 panel (a) represents the same spectrum I($\lambda$) as shown in FIG. 16 panel (c). Panel (b) represents the spectrum shown in panel (a) as observed by simulated spectrometer having bandwidth of $\Delta\lambda$=2 nm. The spectrometer's intensity response was simulated by a function $$I_{lowresolutionspectrometer}(\lambda) = \frac{\int_{\lambda - \Delta\lambda/2}^{\lambda + \Delta\lambda/2} I(\lambda) d\lambda}{\Delta\lambda} \quad (1)$$

where integrals were calculated using finite sum approximations $$I_{lowresolutionspectrometer}(\lambda) = \frac{\sum_{\lambda_i \in [\lambda - \Delta\lambda, \lambda + \Delta\lambda]} I(\lambda_i)}{\sum_{\lambda_i \in [\lambda - \Delta\lambda, \lambda + \Delta\lambda]} 1} \quad (2)$$

where $\lambda_i$, I=1, 2, 3, . . . describes points at which spectrum shown in panel (a) was calculated. Person skilled in the art will recognize that transfer function of this low-resolution spectrometer is a boxcar function centered at $\lambda$ and having full width $\Delta\lambda$. The amplitude of the oscillations in panel (b) is significantly smaller than the amplitude of fringes shown in panel (a).

FIG. 16 represents signal exhibiting beat fringes when distance probe is connected to PMFBS filter, and factors contributing to its formation. Panel (a) represents transmission of PMFBS filter, (b) product of transmission of the system comprising PMFBS filter and distance probe, which is a product of transmission of PMFBS filter given by formula (27) where we selected orientation of polarizer corresponding to lower sign "+", $$T_{PM}(\omega) = \frac{1}{2}\left[1 + \sin\left(\frac{\omega}{\Omega_{PM}}\right)\right],$$

and the reflectance spectrum of distance probe shown in FIG. 14 panel (b). Selection of lower or upper sign can be performed by rotating polarization of the light entering linear polarizer 10008 by means of polarization controller 10006. Panel (c) shows a spectrum of radiation emitted from low coherence source having spectrum shown in FIG. 14 panel (a) after it propagates through PMFBS filter and distance probe.

Figure 17:
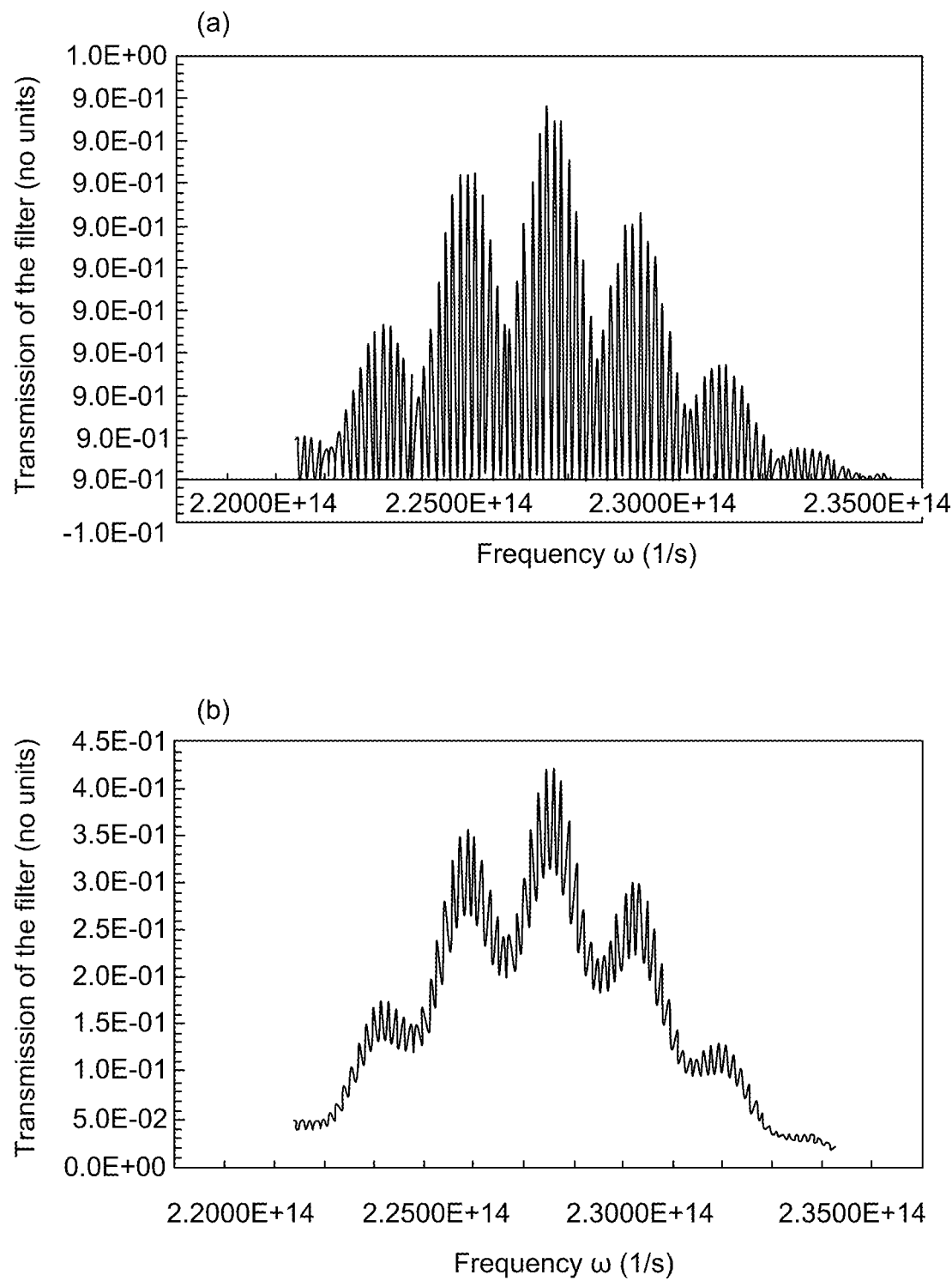
FIG. 17 represents a signal exhibiting beat fringes when the distance probe is connected to a PMFBS filter recorded by a 2 nm resolution spectrometer.

FIG. 17 panel (a) represents the same spectrum $I(\lambda)$ as shown in FIG. 16 panel (c). Panel (b) represents the spectrum shown in panel (a) as observed by simulated spectrometer having bandwidth of $\Delta\lambda=2$ nm. The intensity spectrometer response was simulated by a function $$I_{lowresolutionspectrometer}(\lambda) = \frac{\int_{\lambda-\Delta\lambda/2}^{\lambda+\Delta\lambda/2} I(\lambda)d\lambda}{\Delta\lambda} \quad (1)$$

where integrals were calculated using finite sum approximations $$I_{lowresolutionspectrometer}(\lambda) = \frac{\sum_{\lambda_i \in [\lambda-\Delta\lambda,\lambda+\Delta\lambda]} I(\lambda_i)}{\sum_{\lambda_i \in [\lambda-\Delta\lambda,\lambda+\Delta\lambda]} 1} \quad (2)$$

where $\lambda_i$, i=1, 2, 3, . . . describes points at which spectrum shown in panel (a) was calculated. Persons skilled in the art will recognize that transfer function of this low-resolution spectrometer is a boxcar function centered at $\lambda$ and having full width $\Delta\lambda$. Amplitude of low frequency beat oscillations in panel this figure (b) is significantly larger than amplitude of fringes shown in panel FIG. 15 panel (a), which makes the measurement of beat frequency easier than measurement of high frequency fringes generated by probe shown in FIG. 14.

Figure 18:
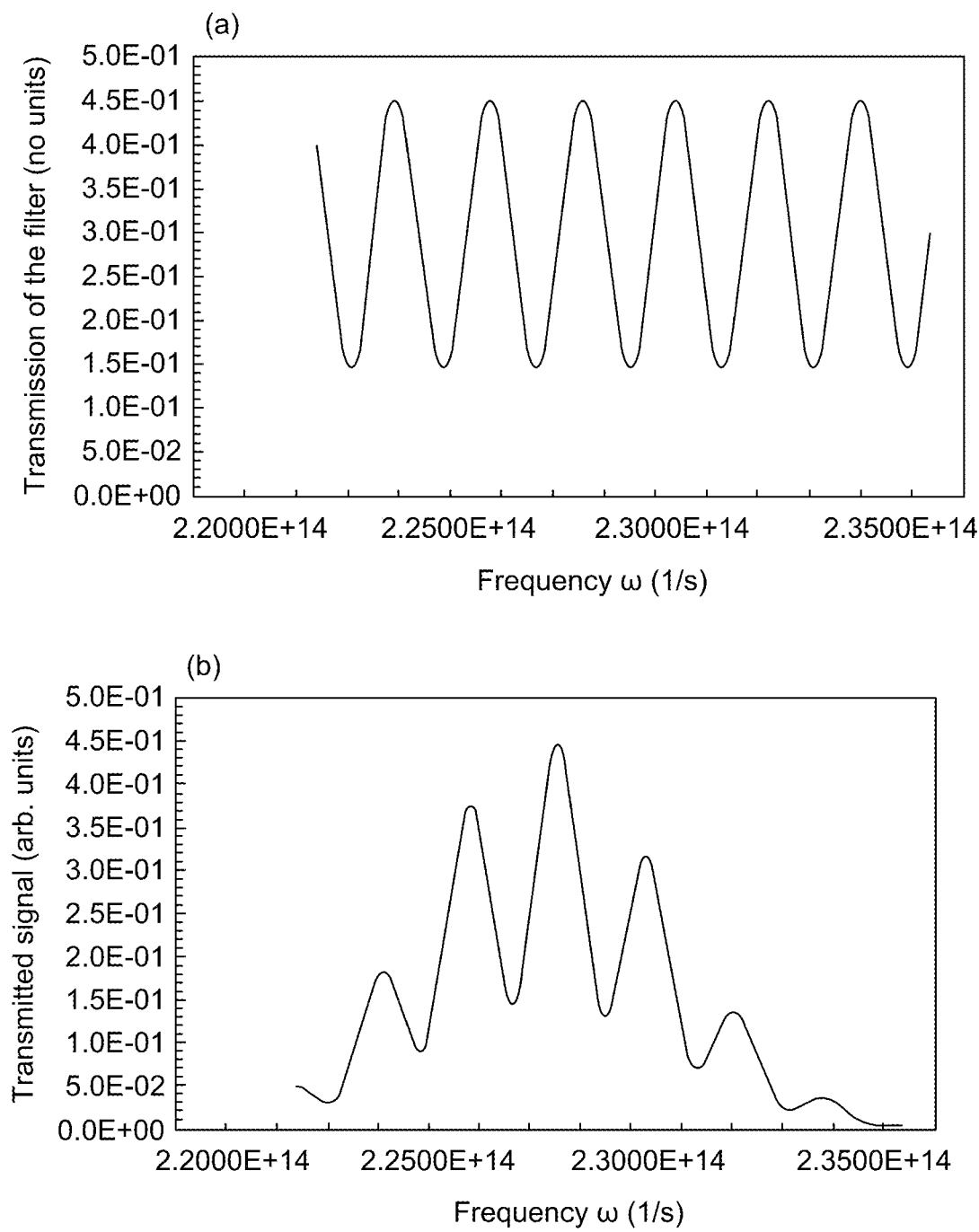
FIG. 18 represents the signal shown in FIG. 16 when measured by spectrometer having a low resolution of 2 nm to resolve individual fringes shown in FIG. 16.

FIG. 18 represents signal shown in FIG. 16 when measured by spectrometer not capable of resolving individual fringes. Panel (a) represents product of transmission of the system comprising of a PMFBS filter and distance probe, which is a product of transmission of PMFBS filter and the reflectance spectrum of distance probe shown in FIG. 14 panel (b) when measured using system having too small resolution to resolve individual high frequency fringes visible in FIG. 16. Panel (b) shows a spectrum of radiation emitted from low coherence source having spectrum shown in FIG. 14 panel (a) after it propagates through PMFBS filter and distance probe, when measured using system having small spectral resolution to which does not resolve individual high frequency fringes visible in FIG. 16 (c). Results presented in this Figure were obtained using system transmission function given by Equation (32), and spectrum of low coherence source defined in the FIG. 10 panel (a). Please note that Equation (32) has been derived using assumption that the beat frequency is much smaller than frequency of fringes generated by light propagating through the distance probe.

Figure 19:
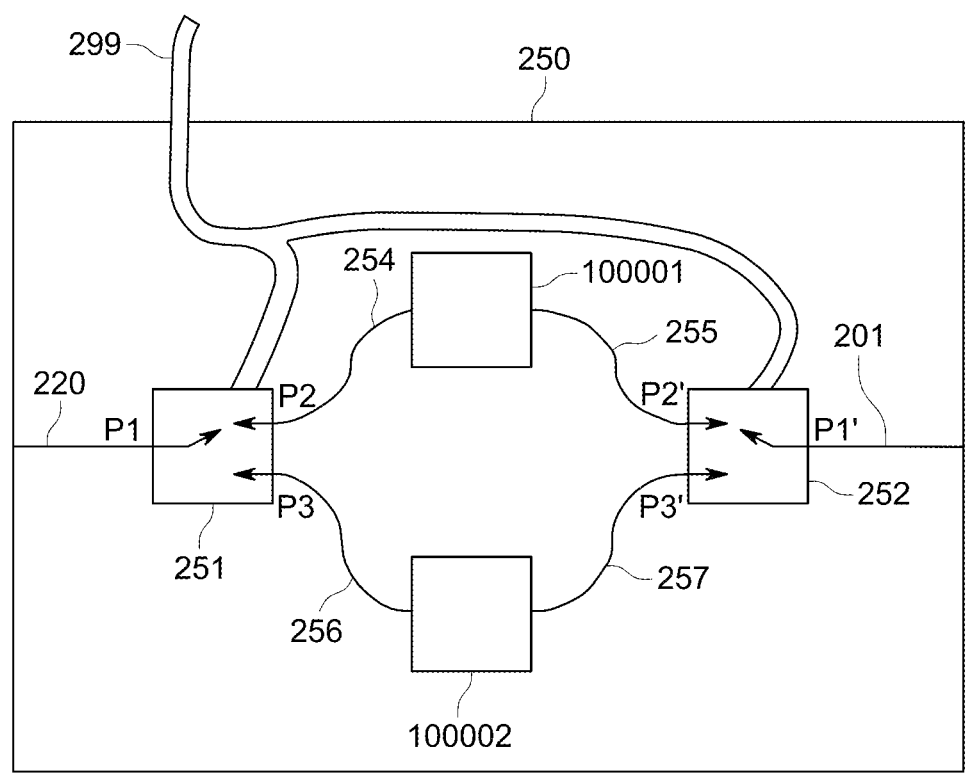
FIG. 19 represents a variable PMFBS filter.

FIG. 19 represents variable PMFBS filter 250. The single mode fiber 220, which is computer controlled, through electrical cable harness 299 fiber optic switch 251, delivers radiation towards the single mode fiber 254 or single mode fiber 256. The single mode fiber 254 is connected to PMFBS filter 100001. PMFBS filter 100001 is connected through single mode fiber 255 to the computer controlled 2×1 optical switch 251 which is controlled through the electrical harness 299. Optical switch 251 has optical terminals P1, P2, and P3. The single mode fiber 256 is connected to PMFBS filter 100002. PMFBS filter 100002 is connected through single mode fiber 257 to the computer controlled 2×1 optical switch 252. Optical switch 252 is connected to single mode fiber 201 through which radiation exits from the variable tunable filter 250. Optical switch 252 has optical terminals P1', P2', and P3'.

When optical switch 251 is in state in which it connects terminals P1 and P2, and optical switch 252 is in the state connecting P2' and P1', the optical radiation entering variable radiation PMFBS filter through fiber 220 propagates through 220, fiber 254, PMFBS filter 100001, fiber 255, switch 252 and exits variable PMFBS filter through fiber 201. In this case, the variable PMFBS filter 250 has optical characteristics of the PMFBS 100001.

When optical switch 251 is in the state in which it connects terminals P1 and P3, and optical switch 252 is in the state connecting P3' and P1', the optical radiation entering variable radiation PMFBS filter through fiber 220 propagates through 220, fiber 256, PMFBS filter 100002, fiber 257, switch 252 and exits variable PMFBS filter through fiber 201. In this case the variable PMFBS filter 250 has optical characteristics of the PMFBS 100002.

For any other combination of states of switches 251 and 252 the radiation cannot propagate through variable PMFBS filter 250, and variable PMFBS filter 250 acts as a beam block.

Figure 20:
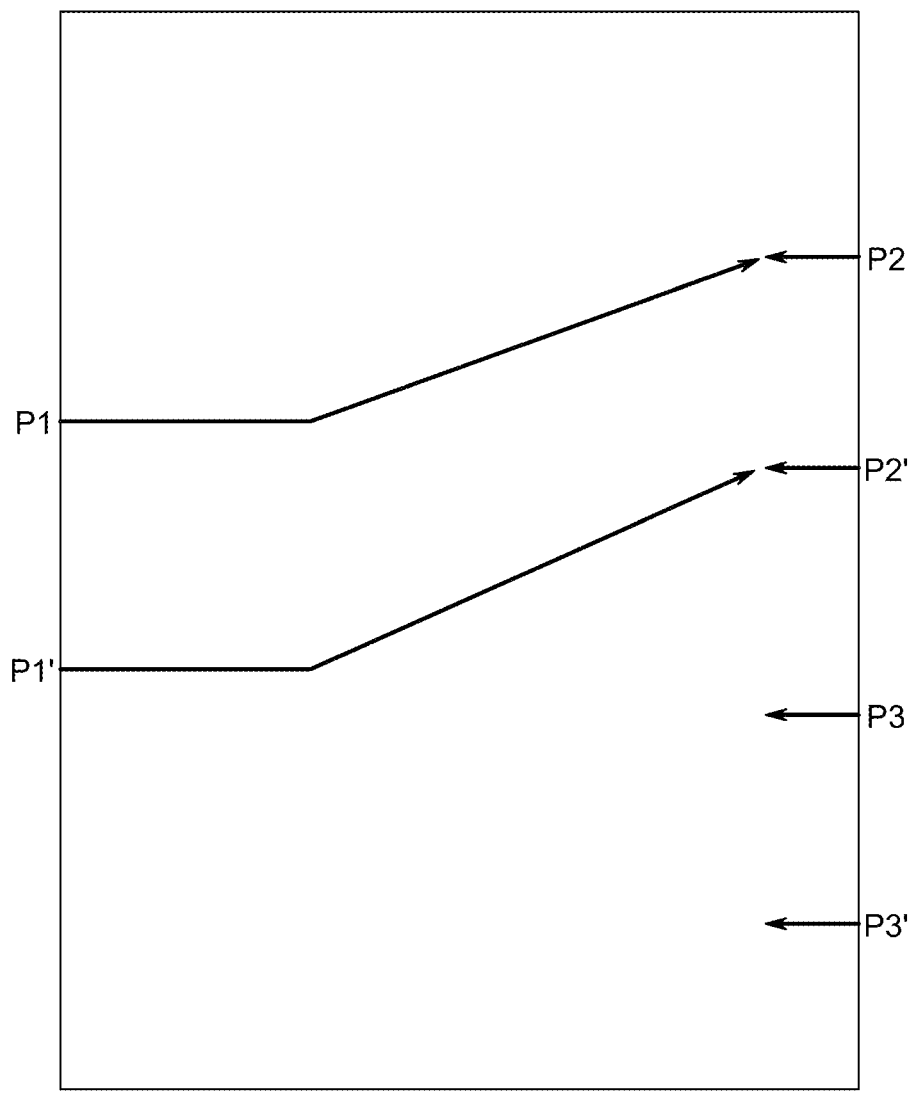
FIG. 20 represents the use of a single 2×2 optical switch in lieu of two 1×2 switches in the PMFBS filter

FIG. 20 represents use of the single 2×2 optical switch which can be used in lieu of two 1×2 switches in PMFBS filter shown in FIG. 18. In this case, the variable optical filter 250 can only have optical characteristics of either 100001 or 100002, and it cannot be used to block the beam.

Figure 21:
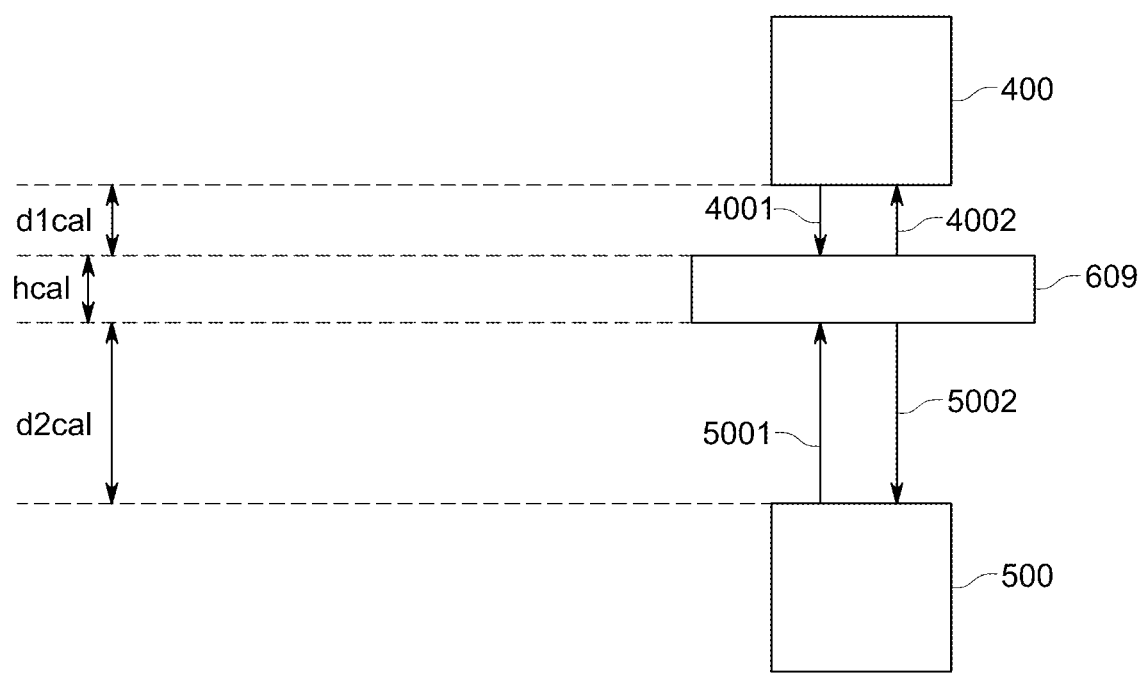
FIG. 21 represents a configuration of the tool when it is calibrated for thickness measurement.

FIG. 21 represents configuration of the tool when it is calibrated for thickness measurement. FIG. 21 represents configuration of the tool when the absolute distance between probe 400 and probe 500 is measured. In this case, the calibrated slab 609 of known thickness hcal is placed between the probes and distance d1cal between top probe and slab of material and probe 400 and distance d2cal between bottom probe 500 and bottom surface of the slab 609 are measured. The distance between top and bottom probe is sum of the distances d1cal, hcal and d2cal.

Figure 22:
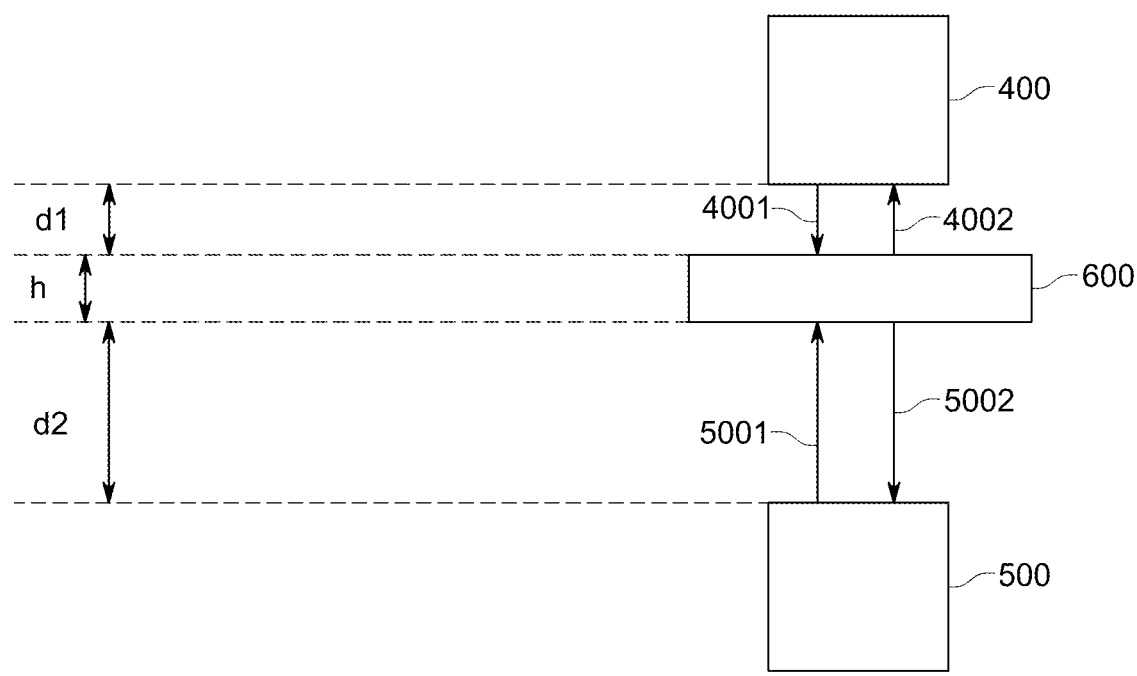
FIG. 22 represents a configuration of the tool when the thickness of the slab of the material is measured.

FIG. 22 represents configuration of the tool when the thickness h of the wafer 600 is measured. In this case the top probe is measuring distance between top probe 400 and wafer 600 named d1, while a bottom probe 500 is measuring distance between bottom probe 500 and wafer 600 named d2.

Figure 23:
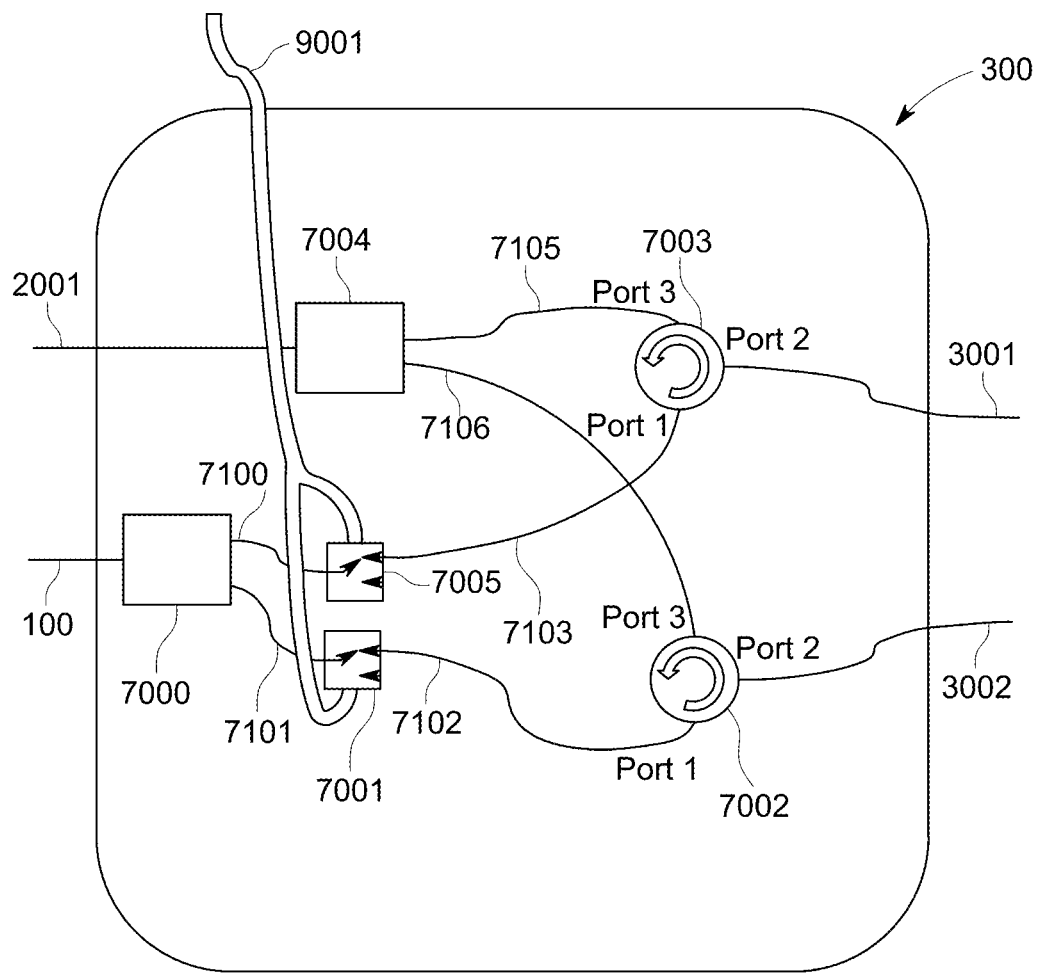
FIG. 23: represents a configuration of the controller unit 300 with two 1×2 fiber optic electromechanical switches.

FIG. 23 Represents configuration of the controller unit 300 with two 1×2 fiber optic electromechanical switches. The single mode fiber 100 guides light into the 1×2 single mode fiber optic splitter 7000. Fiber optic beam splitter 7000 is connected to two output fibers 7100 and 7101. Fiber 7101 is connected to 1×2 fiber optic switch 7001. The state of the switch 7001 is controlled by computer shown in FIG. 1 through electrical harness 9001. The active output terminal of the switch 7001 is connected to single mode optical fiber 7102. The single mode optical fiber 7102 is connected to Port 1 of the optical circulator 7002. Fiber optic circulator 7002 Port 2 is connected to single mode optical fiber 3002 which guides light to and from the bottom optical distance probe 500 shown in FIG. 1. Port 3 of the optical circulator 7002 is connected to single mode optical fiber 7106 to 2×1 optical coupler 7004.

In the similar manner, Fiber 7101 is connected to 1×2 fiber optic switch 7005. The state of the switch 7005 is controlled by computer shown in FIG. 1 through electrical harness 9001. The active output terminal of the switch 7005 is connected to single mode optical fiber 7103. The single mode optical fiber 7103 is connected to Port 1 of the optical circulator 7003. Fiber optic circulator 7003 Port 2 is connected to single mode optical fiber 3001 which guides light to and from the bottom optical distance probe 400 shown in FIG. 1. Port 3 of the optical circulator 7003 is connected to single mode fiber 7105. Single mode fiber 7105 is connected to 2×1 optical coupler 7004. Optical coupler 7004 combines radiation propagating through fibers 7105 and 7106 and directs it towards single mode optical fiber 2001.

The optical radiation enters controller unit 300 through the optical fiber 100 and enters the 1×2 50/50 fiber optic splitter 7100. The radiation exits splitter through optical fibers 7100 and 7101 and approximately half of the intensity of light propagates through fiber 7100 and another half through fiber 7101.

Radiation propagating through the optical fiber 7100 is transmitted to the 1×2 fiber optic electromechanical switch 7005. The radiation is only transmitted to fiber 7103 if the switch is state shown in the FIG. 23. If the switch is in the other state than shown in this FIG. 23, then the radiation is not transmitted to fiber 7103. Light propagating through the fiber 7103 is transmitted to Port 1 of circulator 7003 and is directed by the circulator 7003 through Port 2 into single mode optical fiber 3001 directing it to upper distance probe 400 shown in FIG. 1. Light collected by the distance probe 400 shown in FIG. 1 is directed back into fiber 3001 and transmitted to Port 2 of the circulator 7003. Light entering the circulator 7003 at Port 2 is directed to Port 3 of the circulator 7003 and transmitted through the single mode fiber 7106 towards 2×1 beam coupler 7004. Beam coupler 7004 acts as beam combiner and directs the radiation into single mode fiber 2001 towards spectroscopic system 200 shown in FIG. 1.

Radiation propagating through the optical fiber 7101 is transmitted to 1×2 fiber optic electromechanical switch 7001. Only if switch is state shown in the FIG. 23 it is transmitted to fiber 7102. If the switch 7001 is in the other state that this shown in this FIG. 23 radiation is not transmitted to fiber 7102. Light propagating through the fiber 7102 is transmitted to Port 1 of circulator 7002, and is directed by the circulator 7002 through Port 2 into single mode optical fiber 3002 directing it to lower distance probe 500 shown in FIG. 1. Light collected by the distance probe 500 shown in FIG. 1 is directed back into fiber 3002 and transmitted to Port 2 of the circulator 7002. Light entering the circulator 7002 at Port 2 is directed to Port 3 of the circulator 7002 and transmitted through the single mode fiber 7105 towards 2×1 beam coupler 7004. Beam coupler 7004 acts as beam combiner and directs the radiation into single mode fiber 2001 towards spectroscopic system 200 shown in FIG. 1. In order to avoid interference between radiation propagating through the lower probe 500 shown in FIG. 1 and radiation propagating through upper probe 400 shown in FIG. 1 it is preferable that the sum of the optical lengths of fibers 7102, 3002, 7105, and distance between optical probe 500 and sample 600 is substantially different, in preference by more much more than coherence length of the radiation emitted by source 110 (for example by than 10 cm) than the sum of the lengths of fibers 7103, 3001, 7106, and distance between optical probe 400 and sample 600.

Figure 24:
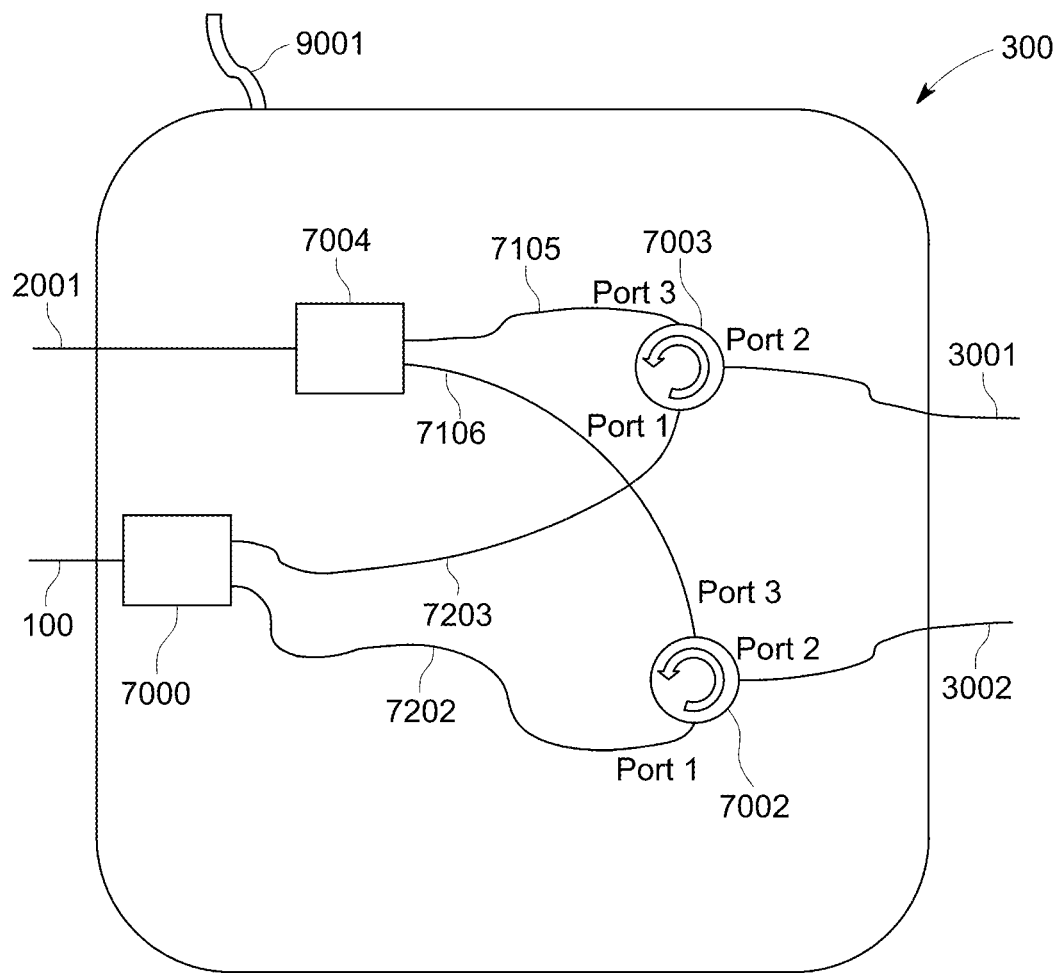
FIG. 24: represents a configuration of the controller unit 300 without fiber optic electromechanical switches

FIG. 24 Represents configuration of the controller unit 300 without fiber optic electromechanical switches. The difference between this and design shown in FIG. 23 is that Fiber 7101, 1×2 fiber optic switch 7001, and fiber 7102 are replaced by a single single-mode optical fiber 7202, and that Fiber 7100, 1×2 fiber optic switch 7005, and fiber 7102 are replaced by a single single-mode optical fiber 7203.

DETAILED DESCRIPTION OF THE INVENTION

The invention disclosed here is used in a system for measurement of slabs of materials such as semiconductor wafers. The metrology system comprises of one or more distance probes position on the same or different sides of the slab of material as shown in FIG. 1. The metrology system is employing a low coherence light source, the optical beam controller which shapes, spectrally filters, and directs light to various optical probes, and directs light reflected from the sample to the spectroscopic unit. The spectroscopic unit comprises of a spectrometer, filters, and computer unit for analysis of the reflected light from the slab of material. The optical beam control unit is controlled by computer system 9000 which also controls position of the measured slab with respect to optical probes by means of XY stage, as well as adjusts position coordinates of probes, and angles of probes with respect to measured slab of material by means of positioning stages shown in FIG. 2.

As shown below, the spectrum of light reflected from the slab contains information about the position of the surface of the slab with respect to the distance probes. This information can be used to calculate the topography, thickness, roughness, and other characteristics of the surface.

The information about physical characteristics of the sample is extracted from the spectrum of the light reflected from sample by means of a spectrometer and computer system.

An example of the distance probe used in our system is shown in FIG. 2. The radiation entering the probe has electric field $$E_{in}(t) = E_{in}(\omega)e^{-i\omega t} \quad (3)$$

As described in the description of FIG. 2, this beam is split into two portions: a portion impinging sample surface, and a reference arm portion impinging reference reflective element.

The reflected portion of the sample beam portion of the radiation is of the form $$E_{sample,backreflected}(t) = \frac{1}{2} r_{sample} t_{samplepath} E_{in}(\omega) e^{-i\omega t + ik2L_{sample}} \quad (4)$$

where the length of the optical path in sample beam is denoted as 2 $L_{sample}$, the amplitude complex reflection coefficient of the sample is denoted $r_{sample}$, and k is the wave vector in the vacuum. The change of the phase and transmission for the beam traveling to and reflected by the samples of optical elements residing in the sample arm including portion of beam-splitter, and lenses. By the length of the optical path, we understand the physical length of the light corrected by factor 1/n for the portion of the path when optical beam travels through the medium having optical refractive index n.

Similarly, the electric field of optical radiation back reflected from the reference beam is given by:

$$E_{reference,backreflected}(t) = \frac{1}{2} r_{reference} t_{referencepath} E_0(\omega) e^{-i\omega t + ik2L_{reference}} \quad (5)$$

where the length of the optical path in reference beam is denoted as $2L_{reference}$, the amplitude complex reflection coefficient of the reference reflection element is denoted $r_{reference}$, the complex transmission coefficient $t_{referencepath}$ describes changes of phase and amplitude of the reference beam due to presence of optical elements in the reference arm.

Both reference and sample beams are recombined by beam-splitter 411 shown in FIG. 3. The resulting beam intensity is given by:

$$I_{total,reflected} = <|E_{sample,backreflected}(t) + E_{reference,backreflected}(t)|^2> \quad (6)$$

By combining Equations (3)-(6) we get $$I_{total,reflected} = \left(\frac{1}{4}|r_{sample}t_{samplepath}|^2 + \frac{1}{4}|r_{reference}t_{referencepath}|^2 + \frac{1}{4}\tilde{B}\cos(k2(L_{reference}-L_{sample}))\right)I_{in} \quad (7)$$

where $I_{in}$ is intensity of light entering probe, and $\tilde{B} = r_{sample}t_{samplepath}r_{reference}t_{referencepath} + (r_{sample}t_{samplepath}r_{reference}t_{referencepath})^*$ where the second summand is the complex conjugate of the first.

Since factors $r_{sample}$, $t_{samplepath}$, $r_{reference}$, $t_{referencepath}$ are slowly varying functions of frequency of radiation used in our system, and since $k=\omega/c$, we can express frequency dependent reflection function of the probe as:

$$R_{DP}(\omega) = I_{total,reflected}/I_{in} \quad (8)$$

or from (7), (ProbeEquation6) we get $$R_{DP}(\omega) = A(\omega) + B(\omega)\cos\left(\frac{2\omega}{c}(L_{reference}-L_{sample}) + \varphi(\omega)\right) \quad (9)$$

where $A(\omega)$, $B(\omega)$, and $\varphi(\omega)$ are slowly varying functions of ω, where "slowly varying" means that their values vary less than 10% within the spectral width of the bandwidth of low coherence light source 110 shown in the FIG. 9. Since the probe is employing a low coherence light sources having central wavelength in range 800-2000 nm, and bandwidth typically 5% and always smaller than 20% of the central wavelength, we can replace slowly varying functions $A(\omega)$, $B(\omega)$, and $\varphi(\omega)$ by constants equal to their values at the central wavelength of light source: A, B, and φ respectively. If in addition we introduce new parameter characterizing frequency of the fringes in the reflectance spectrum of the distance probe:

$$\Omega_{DP} = \frac{c}{2(L_{reference}-L_{sample})} \quad (10)$$

Using Equation (9) we can rewrite Equation (10) in very simple form $$R_{DP}(\omega) = A + B\cos(\omega/\Omega_{DP}+\varphi) \quad (11)$$

The reflectance spectrum of the probe R(ω) exhibits fringes in spectral domain spaced by $2\pi|\Omega_{DP}|$. Fringes in the reflectance spectrum of the probe are discussed also in FIG. 11 and FIG. 14.

The spacing between fringes $$\Lambda = 2\pi|\Omega_{DP}| \quad (12)$$

can be found using many well-known numerical methods including best fitting, zero crossing and Fourier techniques.

In order to find position of the sample using measured value of fringe spacing Λ one has to solve equations (12) and (10). Due to the presence of the absolute value operator in (10), the system of equations may have two solutions one $$L_{sample} = L_{reference} + 4\pi\frac{c}{\Lambda}, \text{ and } L_{sample} = L_{reference} - 4\pi\frac{c}{\Lambda}.$$

Only one of these two solutions correspond to the actual position of the sample, the other is an artifact of that absolute value operator present in the Equation (12).

One can determine which of these two solutions is physical by increasing $L_{sample}$ by amount δ:

$$4\pi\frac{c}{\Lambda} > \delta > 0.$$

In preference $$\delta > 4\pi\frac{c}{20\Lambda}.$$

If the spacing Λ increases due to the change of the position of the probe than the physical solution is given by $$L_{sample} = L_{reference} + 4\pi\frac{c}{\Lambda}.$$

If the spacing Λ decreases due to the change of the position of the probe then the physical solution is given by $$L_{sample} = L_{reference} - 4\pi\frac{c}{\Lambda}.$$

Persons skilled in the art will also notice that one can determine unique solution by decreasing $L_{sample}$ by the amount δ, or alternatively by changing the length of reference arm. The change of $L_{sample}$ by the amount δ can be easily accomplished by means of positioning stages 8880 and 8881 shown in FIG. 2. Another way to avoid ambiguity the absolute value operator in (10) is to assure that $L_{sample} > L_{reference}$ by means of positioning initially probe far away from sample ($L_{sample} \gg L_{reference}$) using stages 8880 or

8881 controlling spacing between upper and lower distance probe and sample respectively. This can be accomplished using method comprising following steps:

Step 1: Positioning the probe far away from the sample when the fringes cannot be resolved by spectroscopic system due to its limited spectral resolution.

Step 2: By gradually approach probe towards sample which increases spacing between fringes, by reducing $L_{sample}$ by reducing distance between probe and sample by means of the computer-controlled positioning stages 8880 or 8881 for upper or lower probes respectively.

Using this procedure we assure that $L_{sample} > L_{reference}$. In this case Equations (10) (12) give us:

$$\Lambda = -4\pi \frac{c}{(L_{reference} - L_{sample})} \quad (13)$$

which provide unique solution for distance $L_{sample}$ $$L_{sample} = L_{reference} + 4\pi \frac{c}{\Lambda} \quad (14)$$

Person skilled in art will see that it is possible also to use similar procedure and positioning probe very close to the sample of positioning initially probe far away $L_{sample} \ll L_{reference}$ to sample using stages 8880 or 8881 for upper and lower stage respectively. And then gradually increasing distance between sample and probe until fringes will become visible. In this case the distance $L_{sample}$ is given by $$L_{sample} = L_{reference} - 4\pi \frac{c}{\Lambda} \quad (15)$$

The above procedures allow us to find uniquely value of $L_{sample}$ which is measure of the distance between probe and the sample.

It is important to note that spacing between fringes in $R(\omega)$ becomes very small, when difference ($L_{reference} - L_{sample}$) has large absolute value. When this spacing is smaller than the resolution of the spectrometer measurement, spacing between fringes in reflectance spectrum $R(\omega)$ cannot be established and distance measurement using this probe becomes impossible using spectrometer alone.

It is possible to extend range of distance measurement using special filter based on polarization maintaining filter.

The comb filter constructed using polarization maintaining (PM) filter is shown in FIG. 12. Its purpose is to produce light having frequency spectrum characterized by series of equally spaced in frequency fringes. Or having transmission which can be described by:

$$T(\omega) = (1/2)\left[1 + \sin\left(\frac{\omega}{\Omega} + \varphi\right)\right] \quad (16)$$

where $\omega$ is frequency of transmitted radiation, $\Omega$ is characteristic constant preset frequency of the filter defining spacing between fringes in frequency space, $\varphi$ is a constant which does not depend on $\Omega$.

Such filters can be readily realized using various forms of interferometers including Michelson interferometers, Mach-Zender interferometers or Fabry-Perot interferometers. In this disclosure we describe design and use of the filter employing polarization maintaining (PM) fiber for producing desired filter used in devices for measurement of the distances and thickness of samples shown in FIG. 12.

The light entering polarization maintaining filter has polarization conditioned by polarization controller in such way that intensity of light coupled to PM fiber with polarization parallel fast and slow axis of the PM fiber is has the similar value. By similar value it is meant in this place that intensity of radiation coupled along fast axis is preferably not more than 30 times larger and not less than 30 times smaller than radiation coupled along the slow axis.

If radiation having electric field $E_0(\omega)e^{-i\omega t}$, and intensity $I = |E_0(\omega)E_0(\omega)^*|$ is entering the PM fiber has components along fast and slow axis equal to $$E_{fast,init}(t) = \frac{1}{\sqrt{2}} E_0(\omega) e^{-i\omega t} \quad (17)$$

and $$E_{slow,init}(t) = \frac{1}{\sqrt{2}} E_0(\omega) e^{-i\omega t} \quad (18)$$

respectively, then assuming that losses in the fiber are negligible the components of the electric field exiting the PM fiber are given by $$E_{fast,final}(t) = E_{fast}(\omega) e^{-i\omega t + ikLn_{fast}} \quad (19)$$

and $$E_{slow,final}(t) = E_{slow}(\omega) e^{-i\omega t + ikLn_{slow}} \quad (20)$$

Respectively, where k is the wave vector in vacuum, L is the length of the fiber. The purpose of the second polarization controller 10006 in FIG. 12 is to rotate relative position of the fast axis of the PM and axis of the polarizer 10008 so they are oriented at angle equal approximately 45 degree one with respect to other. In practical applications this angle should be at approximately 45 degree in preference between 10 and 70 degrees. In the other embodiment of this invention the second polarization controller 1006 is eliminated and the axis of linear polarizer 10008 is oriented at the angle approximately 45 degrees by attaching connectors at custom angle of 45 degrees rather than standard 0 ore 90 degrees angle, or any angle between 15 and 60 degrees with respect to fast axis of linear polarizer. The same applies for the case when the angle is measured from the direction of the slow axis. The electric field of radiation exiting linear polarizer oriented at 45 degrees angle with regard to fast optical axis of PM fiber has following electric field (where first component is parallel to fast axis, and the second component is parallel to slow axis):

$$E_{outpolarizaer}(t) = \frac{1}{\sqrt{2}} E_{fast,final}(t) - \frac{1}{\sqrt{2}} E_{slow,final}(t) \quad (21)$$

When the linear polarizer is oriented in the direction perpendicular to direction 2003 shown in FIG. 13 than we get similar formula $$E_{outpolarizaer}(t) = \frac{1}{\sqrt{2}} E_{fast,final}(t) + \frac{1}{\sqrt{2}} E_{slow,final}(t) \quad (22)$$

From the Equation (21), (19), and (20) we get the intensity of light exiting polarizer:

$$I_{outpolarizer}(t) = \left(\frac{1}{\sqrt{2}} E_{fast,final}(t) - \frac{1}{\sqrt{2}} E_{slow,final}(t)\right)$$
$$\left(\frac{1}{\sqrt{2}} E_{fast,final}(t) - \frac{1}{\sqrt{2}} E_{slow,final}(t)\right)^*$$

and $$I_{outpolarizer} = \frac{1}{2}[1 - \cos(kL(n_{slow} - n_{fast}))] I_0 \quad (23)$$

Similarly, for the perpendicular to direction 2003 shown in FIG. 13 we get $$I_{outpolarizer} = \frac{1}{2}[1 + \cos(kL(n_{slow} - n_{fast}))] I_0 \quad (24)$$

The wave vector is proportional to frequency $k=\omega/c$, and transmission of our filter $$T = \frac{I_{outpolarizer}}{I_0}$$

is given by $$T(\omega) = \frac{1}{2}\left[1 - \cos\left(\frac{\omega}{c} L(n_{slow} - n_{fast})\right)\right] \quad (25)$$

By comparing equation (16) and equation (25) we see that our PM fiber-based filter 10004 indeed is characterized by desired transmission function. By direct inspection of the equations Filter1 and Filter11 we see that the frequency n which is a measure of spacing between fringes in our filter is given by:

$$\Omega_{PM} = c/(L(n_{slow} - n_{fast})) \quad (26)$$

The transmission of the PMFBS filter can be expressed as $$T_{PM}(\omega) = \frac{1}{2}\left[1 \pm \cos\left(\frac{\omega}{\Omega_{PM}}\right)\right] \quad (27)$$

The upper "+" sign in the Equation (27) corresponds to orientation of the polarizer along axis perpendicular to axis 20003 in FIG. 13, while the lower "−" sign corresponds to orientation of the polarizer along axis parallel to axis 20003.

By changing parameters of the PM fiber L, $n_{slow}$, $n_{fast}$ we can adjust value of $\Omega_{PM}$. The preferred mode is to change length of L of the PM fiber.

This filter has been already reduced to practice.

The variable frequency filter based on PM fiber is comprising several fixed frequencies filters connected by polarization maintaining fiber optic switches. By changing the configuration of fiber optic switches one can change the length of the optical path travelled by radiation inside PM fiber and frequency of fringes observed in the transmission spectrum of the variable frequency filter system. The concept of this design is shown in FIGS. 19, 23 and FIG. 24. Person skilled in art will notice that it is possible to generalize this design for plurality of the preset values of the $\Omega_{PM}$.

The transmission spectrum of system comprising distance probe with filter is series is shown in FIGS. 10-11 and FIGS. 13-18 is given by product of $T_{PM}(\omega)$ given by equation (27) and spectrum of distance probe=$R_{DP}(\omega)$ given by:

$$T_{DPPM}(\Omega) = R_{DP}(\Omega) T_{PM}(\Omega) \quad (28)$$

This expression applies to case when distance probe precedes filter as shown in FIG. 10 and when follows filter as shown in FIG. 11.

$$T_{DPPM}(\omega) = [A + B\cos(\omega/\Omega_{DP} + \varphi)]\left[1 \mp \cos\left(\frac{\omega}{\Omega_{PM}}\right)\right] \quad (29)$$

( )( )( )( )( )or $$T_{DPPM}(\omega) = A \mp A\cos\left(\frac{\omega}{\Omega_{PM}}\right) +$$
$$B\cos(\omega/\Omega_{DP} + \varphi) \mp B\cos(\omega/\Omega_{DP} + \varphi)\cos\left(\frac{\omega}{\Omega_{PM}}\right)$$

By applying "product to sum" trigonometric formula to last term $$T_{DPPM}(\omega) = \quad (30)$$
$$A \mp A\cos\left(\frac{\omega}{\Omega_{PM}}\right) + B\cos(\omega/\Omega_{DP} + \varphi) \mp \frac{1}{2}B\cos\left(\frac{\omega}{\Omega_{DP}} + \varphi + \frac{\omega}{\Omega_{PM}}\right) \mp$$
$$\frac{1}{2}B\cos\left(\frac{\omega}{\Omega_{DP}} + \varphi - \frac{\omega}{\Omega_{PM}}\right)$$

It is worth to notice that if $\Omega_{DP} \approx \Omega_{PM}$ we can group in the equation (30) fast and slow varying terms with respect to variable $\omega$. The fast-varying terms will have spacing of fringes spacing of the order of $\Omega_{PM}/(2\pi)$. We can write therefore $T_{DPPM}(\omega)$ as $$T_{DPPM}(\omega) = \left[A \pm \frac{1}{2}B\cos\left(\omega\left(\frac{1}{\Omega_{DP}} - \frac{1}{\Omega_{PM}}\right) + \varphi\right)\right] + \left[\mp A\cos\left(\frac{\omega}{\Omega_{PM}}\right) + \quad (31) \right.$$
$$\left. B\cos(\omega/\Omega_{DP} + \varphi) \mp \frac{1}{2}B\cos\left(\frac{\omega}{\Omega_{DP}} + \varphi + \frac{\omega}{\Omega_{PM}}\right)\right]$$

Where in equation ProbewithFilter6 the first square bracket "[ ]" on right hand side contains slow-varying terms while the second square bracket contains fast-varying terms. When spectrometer used in the system has resolution not enabling resolving fringes spaced by $2\Omega_{PM}/(2\pi)$ then the fast-varying terms will not be observed and will average to zero. In this case which is used in our system the observed transmission is given by:

$$T_{DPPM,observed}(\omega) = \left[A \mp \frac{1}{2}B\cos\left(\omega\left(\frac{1}{\Omega_{DP}} - \frac{1}{\Omega_{PM}}\right) + \varphi\right)\right] \quad (32)$$

The spacing of the fringes A in the spectrum of $T_{DPPM,observed}(\omega)$ is given by:

$$1/\Delta = 2\pi \left| \frac{1}{\Omega_{DP}} - \frac{1}{\Omega_{PM}} \right| \tag{33}$$

Using Equations (26) and (13) we obtain:

$$1/\Delta = \frac{2\pi}{c} \|2(L_{reference} - L_{sample})| - L(n_{slow} - n_{fast})| \tag{34}$$

Equation (34) must be solved for $L_{sample}$.

It is possible to find unique solution of equation (34) by performing measurements using several values of $L(n_{slow} - n_{fast})$. Other method is to simply position probe far away from sample using z positioning stage 8880 for upper probe, or 8881 stage for the lower stage far away from sample when no interference are visible due to limited resolution of the spectrometer $$L_{sample} \gg L_{reference} + \frac{1}{2} L(n_{slow} - n_{fast}) \tag{35}$$

And then gradually reducing $L_{sample}$ by reducing distance between probe and sample by means of the positioning stage 8880 or 8881 for upper or lower probe. The first visible fringe pattern corresponds to $$1/\Delta = \frac{2\pi}{c}(2(-L_{reference} + L_{sample}) - L(n_{slow} - n_{fast})) \tag{36}$$

Which allows us to uniquely determine $L_{sample}$ as:

$$L_{sample} = L_{reference} + \frac{1}{2} L(n_{slow} - n_{fast}) + c/(4\pi\Delta) \tag{37}$$

FIGS. 16 and 17 represent system for measurement of the thickness and topography of the slab of the material. The optical distance between upper probe and wafer is significantly smaller than the larger distance between lower probe and wafer. The interference fringes produced by upper probe have lower frequency than interference fringes produced by the lower probe. The optical spectrum recorded by the spectrometer will exhibit fringes having two distinct frequencies one corresponding to the distance between upper probe and wafer and the second corresponding to distance between lower probe and the wafer. The optical spectrum may be analyzed using variety of the methods to find these frequencies. One possibility is to use Fourier techniques. The Fourier spectrum of the observed interference fringes exhibits two distinct peaks. Since the optical spectrum is acquired at the same time by the same spectrograph employing the same array detector the measurements of these spacing of the fringes produced by the upper and the lower probe is simultaneous.

It is important to state that the fibers 3001 and 3002 guiding light to upper and lower probes together with spacing between upper and lower probe d1 and d2 should be much larger (in a range ten times larger to 10000 larger) than the largest observable value of d1 or d2. In this way the signal the interference of the optical signals originating from crosstalk of upper and lower probes produces fringes having much higher frequency than the highest frequency which can be observed by particular optical system.

These spacings are measured with time difference comparable to time which travel through the distance equal to difference d1, d2 and is obviously negligible with comparison to period of mechanical vibrations which is of the order of 1 ms to 100 ms. In practice slab of material is positioned in horizontal plane xy by an appropriate motion stage xy. By measuring the distances d1 and d2 in various locations x, y of the wafer one can create a thickness map h(x,y) of the wafer and topography map of the upper surface d1(x,y) and lower surface of the wafer. By measuring frequency of each of these peaks we can find distances d1 and d2 and find thickness of the wafer. Measurement of d1 or d2 in various points of the wafer allows measurement of the topography.

In some cases it may be necessary to identify which of the peaks visible in the measured spectrum is attributed to particular probe. This can be done by moving top or bottom probe in vertical direction by a small distance DeltaD. The spectral peak moving in the observed spectrum does correspond to the change of distance between the probe which was moved and proximal to it sample surface.

Alternatively, this can be accomplished by slightly moving wafer in up or down direction by mechanical or electromechanical vertical motion stage. In this case if wafer was moving upwards than the feature demonstrating decrease of frequency when wafer moves upwards corresponds to distance between top probe and top surface of the wafer, while the peak feature in the spectrum demonstrating towards higher frequency corresponds to the distance between lower probe and its proximal surface of the wafer.

In order to calibrate tool we need to measure the distance between probes 400 and 500 D. D can be accurately measured by placing a slab of material of known thickness hcal, later referred as calibration standard between these probes as shown in FIG. 21. In practice as a calibrated standard traceable to some international standard such as NIST traceable gauge.

If the distance between probe 400 and upper surface of the wafer 600 later is designated as d1cal, and the distance between probe 500 and lower surface of the wafer is designated as d2cal then the distance D is given by following formula:

$$D = d1cal + d2cal + hcal \tag{38}$$

If we want to measure thickness of unknown sample h we need to remove calibration standard and replace it be the sample h without changing spacing between probes D as shown in FIG. 21. The thickness of sample can be measured using probes 400, 500 by measuring distance between probe 400 and upper surface of the wafer 600 later we will refer to this distance as d1, and measuring distance between probe 500 and lower surface of the wafer d2.

In this case we have similar equation as (38)

$$D = d1 + d2 + h \tag{39}$$

By combining Equations 1 and 2 we get $$h = D - d1 - d2 \tag{40}$$

Person skilled in art will notice that all quantities on the right-hand side of the (40) are measured by our system. Act of finding value D we call calibration of the system.

It is important to notice that in presence of mechanical vibrations and in presence of motion of slab of material in the vertical direction it is important to perform measurements d1 and d2 simultaneously or within time much shorter (for example if the amplitude of mechanical vibration is 10 um than by performing measurements d1 and d2 in time interval equal 1/100 of the period of mechanical motion we expect error of the measurement to be of the order of 0.1 um) the period of mechanical motion of the wafer.

When the optical path difference between the reference surface and surface of the slab of material is small than the distances d1 and d2 shown in FIG. 22 may be accurately measured using simple reflectance spectra. For larger optical path difference when spacing between fringes becomes comparable or smaller than the resolution of the spectrometer the Fabry Perrot fringes (F) become unresolved and we do not observe fringes and than use of PMFBS filter is used to observe beat fringes.

In order to overcome this limitation of fringe system for larger d1 and d2 measurement we introduce an additional filter 250 in the light path of the radiation observed by spectrometer 210 as shown in FIG. 8. In this way our spectrometer observes radiation reflected from the sample, and further filtered by filter which transmission is very well characterized.

When filter is inserted in the optical path we observe signal which is a product of the transfer function of the filter and spectrum produced by probe interacting with slab as shown in FIG. 18. If frequency of the fringes produced by a filter is similar to the frequency of fringes produced by a probe than we observe beats between FP fringes generated by filter and these generated by probe.

The beat frequency is much lower than the frequency of the fringes generated by probe or filter alone and can be easily measured by inexpensive spectrometer.

If fiber 10001 delivering radiation to controller 500, fiber 2001 delivering light to spectrometer unit, and fibers 3001 and 3002 delivering radiation to sample delivering radiation to distance probes move due to radiation or due to motion of the controller or probes which reside on motion stages 8880 and 8881 then the optical radiation propagating in these fibers changes its state of polarization and polarization dependent losses suffered in the beam splitters and bent portions of the fiber affect spectrum of the radiation detected by spectrometer. One way of reducing this effect is to replace all non polarization maintaining single mode fibers in the system by polarization maintaining fibers.

The invention claimed is:

1. An optical distance measuring system comprising of a low coherence light source, a polarization maintaining fiber based spectral filter, a distance probe, and a spectrometer, where radiation emitted by the low coherence light source propagates through the polarization maintaining fiber based spectral filter and is directed by the distance probe on a slab of material and a reflected radiation from the slab is collected by the same distance probe and directed towards the spectrometer configured to analyze measured interference spectra, wherein the polarization maintaining fiber based spectral filter comprises a polarization controller, and a polarizer.

2. The apparatus as claimed in claim 1, wherein the polarization maintaining fiber based spectral filter is a variable polarization maintaining fiber based spectral filter comprising of plurality of polarization maintaining fiber based spectral filters.

3. The apparatus as claimed in claim 1, wherein the distance probe is provided with a reference arm, and a reference reflective element.

4. The apparatus as claimed in claim 1, comprising two polarization controllers.

5. The apparatus as claimed in claim 1, wherein the polarizer is a linear polarizer.

6. The apparatus as claimed in claim 1, wherein the polarizer is a circular polarizer.

7. The apparatus as claimed in claim 1, comprising at least two probes arranged on opposite sides of the measured slab materials, and having beams probing material colinear, and propagating in opposite direction in the configuration enabling measurement of the thickness of the slab of material.

8. The apparatus as claimed in claim 7, where at least one probe is provided with an alignment facilitating arm.

9. The apparatus as claimed in claim 7, where both probes perform measurements are made simultaneously.

10. A method of measurement of the thickness of the slab using apparatus described in claim 7 in which the distance between top probe and sample is measured, and subsequently distance between the lower distance probe and sample is measured and sample thickness is calculated as a difference between the probes and sum of the distances between the upper probe and the sample and lower probe and the sample.

11. A method of measurement of the topography using the apparatus described in claim 1 comprising steps measurement of the distance z between probe and sample in set of positions x, y on the surface of the sample.

12. The apparatus as in claim 1, wherein all optical fibers are polarization maintaining fibers.

13. The apparatus as in claim 1, wherein all optical fibers are polarization maintaining fibers.

14. The apparatus as in claim 1 wherein the distance probe comprises at least two probes comprising an upper probe one residing above the slab of material and a lower probe residing below the slab of material,
wherein the radiation through the polarization maintaining fiber based spectral filter is directed by the upper probe on an upper surface of the slab of material and a reflected radiation from the upper surface is collected by the upper probe, and wherein the radiation through the polarization maintaining fiber based spectral filter is directed by the lower probe on a lower surface of the slab of material and a reflected radiation from the lower surface is collected by the lower probe.

15. The apparatus as in claim 14, wherein the reflected radiation collected by the upper probe and the lower probe is directed in parallel through the polarization maintaining fiber to an optical beam controller, and later transmitted through a single mode fiber towards the spectrometer module to analyze the interference-pattern.

16. A method of alignment of distance probes in an apparatus comprising:
an optical distance measuring system comprising of:
a low coherence light source, a polarization maintaining fiber based spectral filter, a distance probe, and a spectrometer, where radiation emitted by the low coherence light source propagates through the polarization maintaining fiber based spectral filter and is directed by the distance probe on a slab of material and a reflected radiation from the slab is collected by the same distance probe and directed towards the spectrometer configured to analyze measured interference spectra
at least two probes arranged on opposite sides of the measured slab materials, and having beams probing material colinear, and propagating in opposite direction in the configuration enabling measurement of the thickness of the slab of material;
wherein the method of alignment in the apparatus comprising steps of:

placing probes in orientation when the radiation emitted from a first probe is collected by a second probe and portion of this radiation is directed towards alignment reflecting element, is reflected and directed towards and collected by the first probe and intensity of this radiation is measured by the spectrometer, changing position of the alignment stages to optimize the amount of the radiation collected by the second probe.

17. An optical distance measuring system comprising of a low coherence light source, distance probe, polarization maintaining fiber based spectral filter, and spectrometer, where radiation emitted by the low coherence light source is directed by the distance probe on the slab of material and reflected radiation from the slab is collected by the same distance probe, propagates through polarization maintaining fiber based spectral filter, and is directed towards a spectrometer module configured to analyze an interference-pattern measured spectra, wherein the polarization maintaining fiber based spectral filter comprises a polarization controller, and a polarizer.

18. The apparatus as claimed in claim 17, wherein the polarization maintaining fiber based spectral filter is a variable polarization maintaining fiber based spectral comprising of the manifold of plurality of polarization maintaining fiber based spectral filters.

19. The apparatus as claimed in claim 17, wherein the distance probe is provided with a reference arm, and a reference reflective element.

20. The apparatus as claimed in claim 17, comprising at least two probes arranged on opposite sides of the measured slab materials, and having beams probing material colinear, and propagating in opposite direction in the configuration enabling measurement of the thickness of the slab of materials.

* * * * *